(12) United States Patent
Liu et al.

(10) Patent No.: US 12,418,366 B2
(45) Date of Patent: Sep. 16, 2025

(54) INFORMATION SENDING METHOD, INFORMATION RECEIVING METHOD, TERMINAL, AND CONTROL NODE

(71) Applicant: VIVO MOBILE COMMUNICATION CO., LTD., Guangdong (CN)

(72) Inventors: Shixiao Liu, Chang'an Dongguan (CN); Zichao Ji, Chang'an Dongguan (CN); Siqi Liu, Chang'an Dongguan (CN); Huaming Wu, Chang'an Dongguan (CN); Wei Jiang, Chang'an Dongguan (CN); Shuyan Peng, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 674 days.

(21) Appl. No.: 17/670,286

(22) Filed: Feb. 11, 2022

(65) Prior Publication Data
US 2022/0166561 A1    May 26, 2022

Related U.S. Application Data

(63) Continuation of application No. PCT/CN2020/108247, filed on Aug. 10, 2020.

(30) Foreign Application Priority Data

Aug. 12, 2019  (CN) .......................... 201910741808.8

(51) Int. Cl.
   *H04L 1/1825*   (2023.01)
   *H04L 1/1829*   (2023.01)
   *H04W 4/021*    (2018.01)

(52) U.S. Cl.
   CPC .......... *H04L 1/1825* (2013.01); *H04L 1/1864* (2013.01); *H04W 4/021* (2013.01)

(58) Field of Classification Search
   CPC ... H04L 1/1825; H04L 1/1864; H04L 1/1812; H04L 1/1854; H04L 1/1896;
   (Continued)

(56) References Cited

U.S. PATENT DOCUMENTS

| 2015/0117278 A1 | 4/2015 | Song et al. |
| 2016/0261391 A1 | 9/2016 | Chen et al. |

(Continued)

FOREIGN PATENT DOCUMENTS

| CN | 101741525 A | 6/2010 |
| CN | 107431581 A | 12/2017 |

(Continued)

OTHER PUBLICATIONS

Qualcomm (3GPP TSG RAN WG1, Physical Layer Procedures for sidelink R1-1907274, herein after Qualcomm) (Year: 2019).*

(Continued)

*Primary Examiner* — Nguyen H Ngo
(74) *Attorney, Agent, or Firm* — BROOKS KUSHMAN P.C.

(57) ABSTRACT

An information sending method, an information receiving method, a terminal, and a control node are provided. The information sending method is applied to a sending end and includes: sending first information to a receiving end; where the first information is used to assist the receiving end in determining whether to perform hybrid automatic repeat request HARQ feedback; and the first information includes at least one of the following: a communication range indicator, a correspondence between side lengths of geographical zones and communication ranges, a geographical zone division rule, and a coverage area identifier of a control node serving the sending end.

18 Claims, 7 Drawing Sheets

(58) Field of Classification Search
CPC ... H04W 4/021; H04W 64/003; H04W 28/04; H04W 4/40; H04W 72/23
USPC .................................. 370/216, 241, 242, 252
See application file for complete search history.

(56) References Cited

U.S. PATENT DOCUMENTS

| | | | |
|---|---|---|---|
| 2017/0156174 | A1 | 6/2017 | Chaponniere et al. |
| 2020/0100048 | A1 | 3/2020 | Wu et al. |
| 2020/0162864 | A1* | 5/2020 | Lee ........................ H04L 1/1671 |
| 2020/0323023 | A1* | 10/2020 | Miao ..................... H04W 76/14 |
| 2020/0336872 | A1* | 10/2020 | Basu Mallick ....... H04W 4/029 |
| 2022/0182967 | A1 | 6/2022 | Yoshioka et al. |
| 2022/0264554 | A1* | 8/2022 | Hui ....................... H04W 72/20 |

FOREIGN PATENT DOCUMENTS

| | | |
|---|---|---|
| CN | 108293186 A | 7/2018 |
| CN | 110463108 A | 11/2019 |
| CN | 111435873 A | 7/2020 |
| IN | 103167521 A | 6/2013 |
| WO | 2008038104 A2 | 4/2008 |
| WO | 2014029272 A1 | 2/2014 |
| WO | 2019004688 A1 | 1/2019 |
| WO | 2020/202485 A1 | 10/2020 |

OTHER PUBLICATIONS

Qualcomm (3GPP TSG RAN WG1, "Physical Layer Procedures for sidelink" R1-1907274) (Year: 2019).*

CN Office Action in Application No. 201910741808.8 Dated Apr. 1, 2021.
Written Opinion and International Search Report in Application No. PCT/CN2020/108247 Dated Nov. 18, 2020.
"Discussion on the channel access procedures" 3GPP TSG RAN WG1#96bis, vivo, R1-1904065, Apr. 8, 2019.
"Physical layer procedure for NR sidelink" 3GPP TSG RAN WG1 Meeting #97, vivo, R1-1906142, May 13, 2019.
"On HARQ procedure for NR sidelink" 3GPP TSG RAN WG1 Meeting #97, Sequans Communications, R1-1907083, May 13, 2019.
"Physical layer procedures for sidelink" 3GPP TSG RAN WG1 Meeting #97, Qualcomm Incorporated, R1-1907274, May 13, 2019.
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331, V14.11.0, pp. 1-783, (Jun. 29, 2019).
JP Office Action dated Feb. 14, 2023 as received in Application No. 2022-508585.
First Office Action for Singapore Application No. 11202201348P, dated Mar. 5, 2024, 11 Pages.
Mitsubishi Electric., "Waveform evaluations for V2X sidelink," 3GPP TSG-RAN WG1 Ad-Hoc Meeting 1901, R1-1901147, pp. 2-15, (Jan. 21-25, 2019).
JP Office Action dated Aug. 8, 2023 as received in Application No. 2022-508585.
European Search Report in Application No. 20851933.0 Dated Sep. 20, 2022.
"Physical Layer Procedures for Sidelink" 3GPP TSG RAN WG1 Meeting #97, TCL Communication, R1-1907051, May 12, 2019.

* cited by examiner

| 0 | 1 | 2 | 3 | 0 |
|---|---|---|---|---|
| 4 | 5 | 6 | 7 | 4 |
| 8 | 9 | 10 | 11 | 8 |
| 12 | 13 | 14 | 15 | 12 |
| 0 | 1 | 2 | 3 | 0 |

FIG. 3

|     |     |     |     |     |     |     |
|-----|-----|-----|-----|-----|-----|-----|
| 15  | 12  | 13  | 14  | 15  | 12  | 13  |
| 3   | 0   | 1   | 2   | 3   | 0   | 1   |
| 7   | 4   | 5   | 6   | 7   | 4   | 5   |
| 11  | 8   | 9   | Receiving end | 11 | 8 | 9 |
| 15  | 12  | 13  | 14  | 15  | 12  | 13  |
| 3   | 0   | 1   | 2   | 3   | 0   | 1   |
| 6   | 4   | 5   | 6   | 7   | 4   | 5   |

FIG. 4

INFORMATION SENDING METHOD, INFORMATION RECEIVING METHOD, TERMINAL, AND CONTROL NODE

CROSS-REFERENCE TO RELATED APPLICATIONS

This application is continuation application of PCT International Application No. PCT/CN2020/108247 filed on Aug. 10, 2020, which claims priority to Chinese Patent Application No. 201910741808.8, filed in China on Aug. 12, 2019, the disclosures of which 1 are incorporated herein by reference in their entireties.

TECHNICAL FIELD

This disclosure relates to the field of communications technologies, and in particular, to an information sending method, an information receiving method, a terminal, and a control node.

BACKGROUND

In the related art, in a new radio (NR) sidelink (Sidelink, also referred to as direct communication link) standardization process, a groupcast hybrid automatic repeat request (HARD) function is supported; and for groupcast communication, a sending end needs to perform retransmission once any receiving end feeds back negative acknowledgment information (NACK).

Under such premise, some problems may occur. During groupcast communication, remote users can also receive data packets, and a longer distance indicates a lower decoding success rate for the remote users. In this case, the users feed back a negative acknowledgment (NACK), leading to unnecessary retransmissions by a sending-end user. Such unnecessary retransmissions may cause additional interference to other users, deteriorating system performance and increasing feedback overheads.

SUMMARY

Embodiments of this disclosure provide an information sending method, an information receiving method, a terminal, and a control node.

According to a first aspect, an embodiment of this disclosure provides an information sending method, applied to a sending end and including:
sending first information to a receiving end; where
the first information is used to assist the receiving end in determining whether to perform hybrid automatic repeat request HARQ feedback; and
the first information includes at least one of the following:
a communication range indicator, a correspondence between side lengths of geographical zones and communication ranges, a geographical zone division rule, and a coverage area identifier of a control node serving the sending end.

According to a second aspect, an embodiment of this disclosure provides an information receiving method, applied to a receiving end and including:
receiving first information sent by a sending end; where
the first information is used to assist the receiving end in determining whether to perform hybrid automatic repeat request HARQ feedback; and
the first information includes at least one of the following:
a communication range indicator, a correspondence between side lengths of geographical zones and communication ranges, a geographical zone division rule, and a coverage area identifier of a control node serving the sending end.

According to a third aspect, an embodiment of this disclosure provides an information sending method, applied to a control node and including:
sending information about a coverage area identifier of the control node to a terminal; where
the terminal is a receiving end or a sending end.

According to a fourth aspect, an embodiment of this disclosure provides a terminal, where the terminal is a sending end and includes:
a first sending module, configured to send first information to a receiving end, where
the first information is used to assist the receiving end in determining whether to perform hybrid automatic repeat request HARQ feedback; and
the first information includes at least one of the following:
a communication range indicator, a correspondence between side lengths of geographical zones and communication ranges, a geographical zone division rule, and a coverage area identifier of a control node serving the sending end.

According to a fifth aspect, an embodiment of this disclosure provides a terminal, where the terminal is a sending end, including a memory, a processor, and a computer program stored in the memory and capable of running on the processor, where when the computer program is executed by the processor, the steps of the foregoing information sending method are implemented.

According to a sixth aspect, an embodiment of this disclosure provides a terminal, where the terminal is a receiving end, including:
a first receiving module, configured to receive first information sent by a sending end; where
the first information is used to assist the receiving end in determining whether to perform hybrid automatic repeat request HARQ feedback; and
the first information includes at least one of the following:
a communication range indicator, a correspondence between side lengths of geographical zones and communication ranges, a geographical zone division rule, and a coverage area identifier of a control node serving the sending end.

According to a seventh aspect, an embodiment of this disclosure provides a terminal, where the terminal is a receiving end, including a memory, a processor, and a computer program stored in the memory and capable of running on the processor, where when the computer program is executed by the processor, the steps of the foregoing information receiving method are implemented.

According to an eighth aspect, an embodiment of this disclosure provides a control node, including:
a second sending module, configured to send information about a coverage area identifier of the control node to a terminal; where
the terminal is a receiving end or a sending end.

According to a ninth aspect, an embodiment of this disclosure provides a control node, including a memory, a processor, and a computer program stored in the memory and capable of running on the processor, where when the computer program is executed by the processor, the steps of the foregoing information sending method are implemented.

According to a tenth aspect, an embodiment of this disclosure provides a computer-readable storage medium. The computer-readable storage medium stores a computer program, and when the computer program is executed by a processor, the steps of the foregoing information receiving method or the steps of the foregoing information sending method are implemented.

BRIEF DESCRIPTION OF DRAWINGS

FIG. 3 is a second schematic diagram of a relationship between a location of a receiving end and a communication range indicated by a communication range indicator;

FIG. 4 is a third schematic diagram of a relationship between a location of a receiving end and a communication range indicated by a communication range indicator;

DETAILED DESCRIPTION OF EMBODIMENTS

Figures 1, 2:
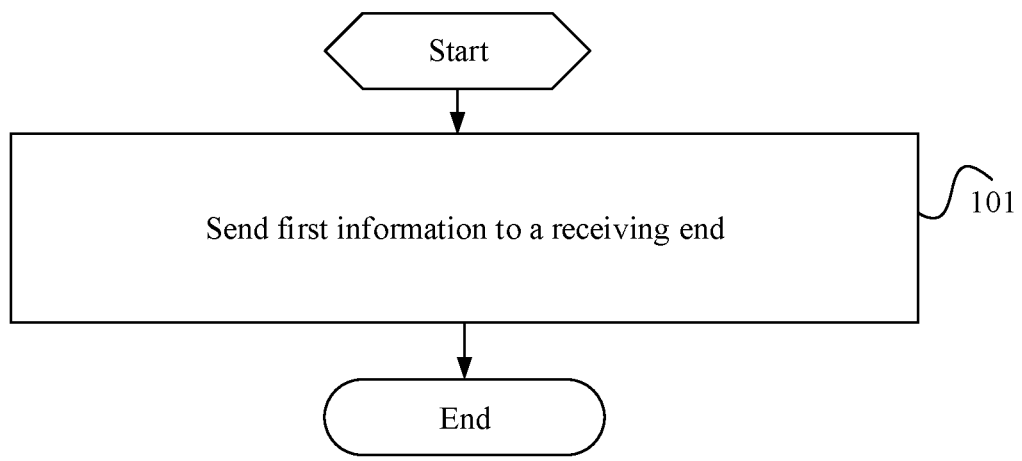
FIG. 1 is a schematic flowchart of an information sending method applied to a sending end according to an embodiment of this disclosure.
FIG. 2 is a first schematic diagram of a relationship between a location of a receiving end and a communication range indicated by a communication range indicator.

To make the objectives, technical solutions, and advantages of this disclosure clearer, the following further describes this disclosure in detail with reference to the accompanying drawings and specific embodiments.

For description of the embodiments of this disclosure, some concepts used in the following description are first described.

Currently, unicast, groupcast, and broadcast communication is supported in new radio (NR) sidelink (Sidelink) in the related art. A hybrid automatic repeat request (HARQ) is supported in groupcast and unicast communication. Groupcast communication is a one-to-many communication mode. In a state in which a HARQ function is enabled, a NACK fed back by any receiving end in a group may cause HARQ retransmission. Remote receiving users are prone to incorrect reception because of poor channel quality, building obstruction, and other factors, and retransmission is resulted. However, whether correct reception is implemented for the remote users imposes slight impact on overall system performance, and a sending-end user does not care too much about a reception success rate of the remote users. Therefore, HARQ feedback in this case is usually unnecessary; instead, such feedback may cause some unnecessary retransmissions, and increase interference to other sending users that are sending packets. Feedback from the remote users also increases unnecessary feedback overheads and deteriorates system performance.

Therefore, a range-based HARQ feedback mechanism has been proposed. Such mechanism may be based on a distance between a sending-end user and a receiving-end user, or based on reference signal received power (RSRP) measurement. Which one or both are specifically used has been determined yet. However, at present, there is still no definite scheme on how to determine a distance between the sending-end user and the receiving-end user, and this is a pending problem.

In long term evolution (LTE) vehicle-to-everything (V2X), a higher layer has a set of rules for division of geographical zones to group geographical locations of the entire map into many geographical zones, each zone assigned with one ID. A length and width of each zone and reuse factors in length and width dimensions may be all configured by the higher layer. The reuse factors in the length and width dimensions are the number of different zone IDs in the length and width dimensions. For example, if the reuse factor in the long dimension is 4, there may be only four different zone IDs (for example: 0, 1, 2, and 3) in the length dimension. User equipment (UE, also referred to as terminal) can obtain its own zone ID through calculation according to this set of rules and its own longitude and latitude information obtained by using a global positioning system (GPS). However, a zone ID defined by the higher layer is associated only with a resource pool. At present, the physical layer has not yet defined a geographical zone division rule and a rule flow of HARQ retransmission using the division rule.

Specific calculation rules (rule A) for division of zones by the higher layer in LTE are as follows:

A11. Assuming that a latitude and longitude of UE are (x,y) respectively;

A12. A length and width of one zone are L and W, respectively;

A13. Reuse granularities in the longitude and latitude are A and B, respectively;

A14. IDs (x1,y1) of the UE in the latitude and longitude are calculated as: x1=mod(floor(x/L),A) and y1=mod(floor(y/W),B), respectively;

A15. A final zone ID of the UE is: id=y1*A+x1.

In view of the problem that carrying coordinate information for real-time positioning of users in the related art causes relatively large signaling overheads, this disclosure provides an information sending method, an information receiving method, a terminal, and a control node.

As shown in FIG. 1, an embodiment of this disclosure provides an information sending method, applied to a sending end and including:

Step 101: Send first information to a receiving end.

It should be noted that the first information is used to assist the receiving end in determining whether to perform hybrid automatic repeat request (HARQ) feedback; and the first information includes at least one of the following:
  a communication range indicator, a correspondence between side lengths of geographical zones and communication ranges, a geographical zone division rule, and a coverage area identifier of a control node serving the sending end.

It should be noted that the problems of large signaling overheads and low system resource utilization in a HARQ feedback manner in the related art can be resolved in this embodiment of this disclosure, to reduce communication overheads.

It should be further noted that the first information does not include location coordinate information for real-time positioning of a sending end (that is, based on GNSS positioning information), thereby reducing signaling overheads for sending the first information.

It should be noted that content included in the first information mainly varies in the following cases:

M11. The first information includes: the communication range indicator.

It should be further noted that, in this case, the first information further includes: a geographical zone identifier (zone ID) of the sending end.

M12. The first information includes: the geographical zone division rule and the correspondence between side lengths of geographical zones and communication ranges.

It should be further noted that, in this case, the first information further includes: the geographical zone identifier of the sending end.

M13. The first information includes: the coverage area identifier of the control node serving the sending end.

M14. The first information includes: the coverage area identifier of the control node serving the sending end and the communication range indicator.

Optionally, it should be further noted that, in this case, the first information may further include: the geographical zone identifier of the sending end.

It should be noted that the first information is indicated by using at least one of the following manners:

M21. physical sidelink control information (SCI);

M22. direct communication interface radio resource control information (PC5 RRC); and M23. medium access control control element (MAC CE).

The following specifically describes this embodiment of this disclosure in the following different cases:

Case 1: The first information includes: the geographical zone identifier of the sending end and the communication range indicator.

In this case, geographical locations are divided into zones, and a division rule is related to a communication range. The sending end and the receiving end obtain, through calculation, their respective geographical zone identifiers according to the division rule each time, and whether to perform HARQ feedback is determined based on the geographical zone identifier of the sending end and the geographical zone identifier of the receiving end.

Specifically, a manner of obtaining the geographical zone identifier of the sending end includes:

determining the geographical zone identifier of the sending end according to a target division rule of geographical zone.

Further, the target division rule includes:

N11. a correspondence between geographical zone division granularities and target communication ranges.

It should be noted that the target communication range is at least one fixed value prescribed by a protocol. Further, the target division rule is prescribed by the protocol, and a geographical zone division granularity each time is determined by one value of at least one preconfigured fixed value. For example, the division granularity is side lengths of the geographical zone and reuse factors of dimensions. In actual application, a smallest communication range in the preconfigured fixed values is used as the side lengths of the geographical zone in the division granularity.

For example, assuming that a minimum value of communication range is 50 m and a maximum value is 1000 m, the side lengths of the geographical zone in the geographical zone division granularity may be equal to the minimum value 50 m of communication range. In this case, the reuse factors of the length and width dimensions can be also determined. The maximum value of communication range is 1000 m; therefore, in a case of the maximum communication range, a repeated geographical zone identifier is not allowed in length and width dimensions of a range 1000 m away from the sending end. That is, a repeated geographical zone identifier is allowed only after 20 geographical zones in the length and width dimensions, so as to ensure reliability of communication. Therefore, minimum values of the reuse factors in the length and width dimensions are 20.

N12. a geographical zone identifier calculation manner.

It should be noted that, according to the calculation formula, the sending end may obtain its own geographical zone identifier through calculation. For example, the calculation manner may be the rule A described above.

It should be further noted that in this case, the target division rule is prescribed by the protocol, the sending end and receiving end may learn, according to the communication protocol, a target division rule used in each communication, and the sending end and receiving end obtain their respective geographical zone identifiers through calculation according to the target division rule.

It should be further noted that the maximum number of geographical zone identifiers is related to the reuse factors (reuse granularity) of the length and width dimensions. In order to reduce transmission overheads for geographical zone identifiers, each geographical zone identifier may correspond to one codepoint. In other words, after obtaining its own geographical zone identifier, the sending end merely needs to transmit a codepoint corresponding to the geographical zone identifier during transmission.

For example, assuming that the reuse factors A and B of the side lengths (length and width) of the geographical zone are both 4, the geographical zone identifier of the sending end in SCI that is sent by the sending end to the receiving end needs to be indicated by ceil(log 2(A*B)) bits, that is 4 bits.

Specifically, in this case, the communication range indicator is used for indicating a receiving-end zone for which HARQ feedback is required, and further, the communication range indicator is used for indicating at least one of the following:

N21. a layer index of a geographical zone adjacent to a geographical zone in which the sending end is located.

For example, the layer index is n, that is, all receiving ends in an $n^{th}$-layer geographical zone adjacent to the geographical zone in which the sending end is located need to perform HARQ feedback. In particular, when n is 0, it indicates that HARQ feedback is performed only when the receiving end and the sending end are located in the same geographical zone.

Further, assuming that the communication range corresponds to four codepoints: 00, 01, 10, and 11, corresponding to values of n, namely 0, 1, 2, and 3, respectively. If a codepoint carried in the SCI sent by the sending end to the receiving end is 01, and a corresponding value of n is 1, assuming that the geographical zone identifier of the sending end is 10, all receiving ends within a geographical zone corresponding to the geographical zone identifier and those within one layer of geographical zones adjacent to the geographical zone need to perform HARQ feedback. As shown in FIG. 2, receiving ends in the dashed box in FIG. 2 needs to perform HARQ feedback to the sending end.

N22. a geographical distance between the sending end and the receiving end.

For example, the geographical distance is 50 m, that is, all receiving ends within 50 m from the sending end need to perform HARQ feedback.

N23. a relationship between the geographical zone identifier of the sending end and that of the receiving end.

It should be noted that the relationship may be that a difference between the geographical region identifier of the sending end and the geographical region identifier of the receiving end satisfies a specific condition, or that a result of a modulus operation on the geographical region identifier of the sending end and the geographical region identifier of the receiving end satisfies a specific condition. The receiving end performs HARQ feedback only when the specific condition is satisfied.

It should be further noted that the communication range indicator includes one first target codepoint.

The first target codepoint is one of at least one first preset codepoint, and each codepoint in the at least one first preset codepoint corresponds to one communication range.

For example, the communication range indicator is used to indicate that a layer index of the geographical zone adjacent to the geographical zone in which the sending end is located is n. When the codepoint 01 corresponds to a value 2 of the communication range indicator, corresponding to a range of a 2nd-layer the geographical zone adjacent to the geographical zone in which the receiving end is located, assuming that the number of codepoints is N, ceil(log 2(N)) bits in the SCI sent by the sending end to the receiving end may be used to indicate the communication range indicator.

For example, the communication range indicator is used for indicating the geographical distance between the sending end and the receiving end. When the codepoint 01 corresponds to a value 100 m of the communication range indicator, all receiving ends within a range of 100 m away from the sending end need to perform HARQ feedback.

For example, the communication range indicator is used for indicating the relationship between the geographical zone identifier of the sending end and that of the receiving end, for example, indicating a difference threshold between the geographical zone identifiers. When the codepoint 01 corresponds to a value 4 of the difference threshold, it indicates that the receiving end performs HARQ feedback only when the difference between the two geographical zone identifiers is less than 4.

It should be further noted that in this case, after receiving the first information, the receiving end performs the following actions: based on the geographical zone identifier of the sending end and the communication range indicator, determining whether the receiving end is located in a range indicated by the communication range indicator; and if the receiving end is located within the range indicated by the communication range indicator, performing HARQ feedback.

Further, because information indicated by the communication range indicator is different, specific operations of the receiving end are also different. From the perspective of the information indicated by the communication range indicator, the following describes in detail specific implementation cases in which the receiving end determines, based on the geographical zone identifier of the sending end and the communication range indicator, whether the receiving end is located in the range indicated by the communication range indicator.

N31. The communication range indicator is used for indicating the layer index of the geographical zone adjacent to the geographical zone in which the sending end is located.

In this case, the receiving end implements one of the following cases:

N311: if the layer index is zero and a geographical zone identifier of the receiving end is the same as the geographical zone identifier of the sending end, the receiving end is located within the range indicated by the communication range indicator;

N312: if the layer index is zero and the geographical zone identifier of the receiving end is different from the geographical zone identifier of the sending end, the receiving end is located beyond the range indicated by the communication range indicator; and N313: if the layer index is non-zero, determining, based on the geographical zone identifier of the receiving end and the geographical zone identifier of the sending end, whether the receiving end is located within a range of an $n^{th}$-layer geographical zone adjacent to the geographical zone in which the sending end is located, where if located within the range of the $n^{th}$-layer geographical zone, the receiving end is located within the range indicated by the communication range indicator; or if not located within the range of the $n^{th}$-layer geographical zone, the receiving end is not located within the range indicated by the communication range indicator; where n is an integer greater than or equal to 1.

N32. The communication range indicator is used for indicating the geographical distance between the sending end and the receiving end.

In this case, the receiving end implements one of the following cases:

N321: determining a first distance and a second distance based on positioning information of the receiving end and the geographical zone identifier of the sending end, where if the first distance is less than the geographical distance between the sending end and the receiving end, the receiving end is located within the range indicated by the communication range indicator, or if the second distance is less than the geographical distance between the sending end and the receiving end, the receiving end is located within the range indicated by the communication range indicator, or if an average value of the first distance and the second distance is less than the geographical distance between the sending end and the receiving end, the receiving end is located within the range indicated by the communication range indicator, where the first distance is greater than the second distance, and specifically, the first distance is a maximum value of the distance between the receiving end and the sending end, and the second distance is a minimum value of the distance between the receiving end and the sending end;

N322: obtaining a first target distance based on the positioning information of the receiving end and a first reference point of the geographical zone in which the sending end is located, where if the first target distance is less than the geographical distance between the sending end and the receiving end, the receiving end is located within the range indicated by the communication range indicator; where for example, the first reference point is a center point of the geographical zone;

N323: obtaining a second target distance based on a second reference point of a geographical zone in which the receiving end is located and a third reference point of the geographical zone in which the sending end is located, where if the second target distance is less than the geographical distance between the sending end and the receiving end, the receiving end is located within the range indicated by the communication range indicator; where for example, the second reference point and the third reference point are both center points of the geographical zone; and N324: obtaining a first reference value based on a geographical zone identifier of the receiving end and the geographical zone identifier of the sending end, where if the first reference value is less than the geographical distance between the sending end and the receiving end, the receiving end is located within the range indicated by the communication range indicator; where for example, in this case, a difference or modulus value between the geographical zone identifier of the receiving end and the geographical zone identifier of the sending end is calculated, and then an operation is performed on the difference or modulus value and a specific amount (for example, the side length of the geographical zone) to obtain an operation result as the first reference value. If the first reference value is less than the geographical distance between the sending end and the receiving end, it indicates that the receiving end is located within the range indicated by the communication range indicator.

N33. The communication range indicator is used for indicating the relationship between the geographical zone identifier of the sending end and that of the receiving end.

In this case, the receiving end implements one of the following cases:

N331: when the relationship between the geographical zone identifier of the sending end and that of the receiving end is a difference threshold for the geographical zone identifiers, if an absolute value of a difference between the geographical zone identifier of the sending end and that of the receiving end is less than the difference threshold, the receiving end is located within the range indicated by the communication range indicator; and N332: when the relationship between the geographical zone identifier of the sending end and that of the receiving end is a first threshold obtained through a modular operation on geographical zone identifiers, and if a result of the modular operation on the geographical zone identifiers of the sending end and the receiving end meets a requirement of the first threshold, the receiving end is located within the range indicated by the communication range indicator.

For example, a modular operation is performed on the geographical zone identifiers between the sending end and the receiving end to obtain an operation result. If the operation result is less than the first threshold, it indicates that the receiving end is located within the range indicated by the communication range indicator, or if the operation result is greater than the first threshold, it indicates that the receiving end is located within the range indicated by the communication range indicator.

It should be further noted that, in this case, the first information may further include: auxiliary indication information within a communication range, and the auxiliary indication information is used for determining at least one target zone within the communication range.

Specifically, the auxiliary indication information includes: a second target codepoint.

The second target codepoint is one of at least one second preset codepoint, and each codepoint in the at least one second preset codepoint corresponds to one target zone within a communication range.

For example, the auxiliary indication information may be one or more specific zones within the communication range; each specific zone may be indicated by one codepoint, and one codepoint may also indicate a plurality of specific zones. That is, the auxiliary indication information includes at least one preconfigured codepoint, and each codepoint corresponds to one or more specific zones within the communication range.

Figure 3:
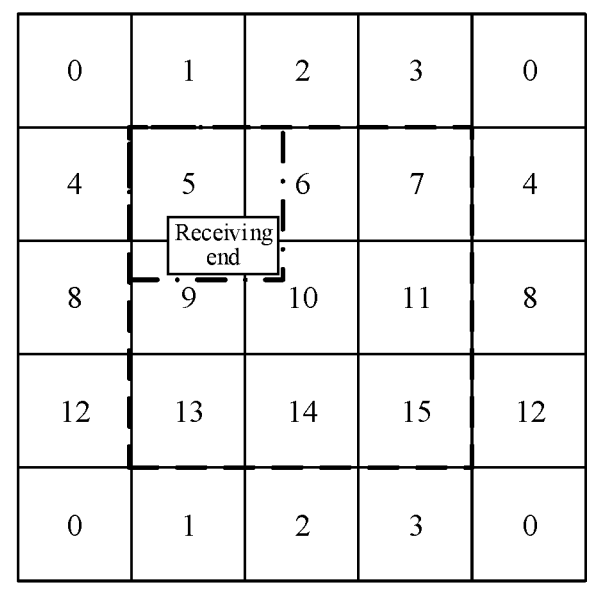

For example, on the basis of FIG. 2, if the SCI sent by the sending end to the receiving end also carries the auxiliary indication information within the communication range, and if an auxiliary indication correspondingly includes four codepoints 00, 01, 10, and 11, corresponding zones are four equally divided partial zones within the communication range in directions of upper left, upper right, lower left, and lower right. If the auxiliary indication information within the communication range carried in the SCI sent by the sending end to the receiving end indicates a codepoint of 00, as shown in FIG. 3, only receiving ends located within the dash-dotted zone in FIG. 3 need to perform HARQ feedback to the sending end.

Specifically, in this case, after receiving the first information, the receiving end performs the following action:

determining, based on the geographical zone identifier of the sending end and the communication range indicator, whether the receiving end is located within a range indicated by the communication range indicator; if the receiving end is located within the range indicated by the communication range indicator, determining, based on the auxiliary indication information within the communication range, whether the receiving end is located within a range indicated by the auxiliary indication information within the communication range; and if the receiving end is located within the range indicated by the auxiliary indication information within the communication range, performing HARQ feedback.

It should be noted that in this case, the receiving end needs to perform HARQ feedback to the sending end only when the receiving end is located not only within the range indicated by the communication range indicator but also within the range indicated by the auxiliary indication information within the communication range; and the receiving end does not perform HARQ feedback provided that neither of the conditions is satisfied.

Further, because information indicated by the communication range indicator is different, specific operations of the receiving end are also different. Specifically, for specific implementation cases in which the receiving end determines, based on the geographical zone identifier of the sending end and the communication range indicator, whether the receiving end is located in the range indicated by the communication range indicator, refer to the implementation processes in N31 to N33. Details are not repeated herein.

Case 2: The first information includes: the geographical zone identifier of the sending end, the correspondence between side lengths of geographical zones and communication ranges, and the geographical zone division rule.

It should be noted that in this case, geographical locations are divided into zones, and a division rule is related to a communication range of each communication. The sending end and the receiving end obtain, through calculation, their respective geographical zone identifiers according to the division rule each time, and whether to perform HARQ feedback is determined based on the geographical zone identifier of the sending end and the geographical zone identifier of the receiving end.

Specifically, a manner of obtaining the geographical zone identifier of the sending end includes:
determining the geographical zone identifier of the sending end according to the geographical zone division rule.

Further, the geographical zone division rule includes:
M11. side length indication information of a geographical zone;
M12. per-dimension reuse factor indication information of the geographical zone; and
M13. a geographical zone identifier calculation manner.

It should be noted that, according to the calculation formula, the sending end may obtain its own geographical zone identifier through calculation. For example, the calculation manner may be the rule A described above.

It should be noted that in this case, the geographical zone division rule is transmitted, and because the geographical zone division rule includes the side length indication information of the geographical zone and the first information also includes: an indication of a relationship between side lengths of geographical zones and communication ranges (that is, side lengths of a geographical zone are values related to a communication range for each data packet, for example, the length and width of the geographical zone are 1/Q times the communication range, and Q is a positive number), the receiving end can obtain a communication range of a current time based on the foregoing parameters. In other words, in this case, the communication range is implicitly indicated.

It should be noted that the foregoing M11 and M12, and the indication of the relationship between side lengths of geographical zones and communication ranges may be all represented by a set of candidate codepoints, and a corresponding codepoint combination can be selected during transmission.

It should be further noted that in this case, because the sending end notifies the receiving end of the geographical zone division rule in each communication, so that the receiving end can obtain, through calculation, its own geographical zone identifier according to the geographical zone division rule.

It should be noted that in this case, after receiving the first information, the receiving end performs the following actions: determining, based on a geographical zone identifier of the receiving end and the geographical zone identifier of the sending end, whether the receiving end is located within a range of an $h^{th}$-layer geographical zone adjacent to a geographical zone in which the sending end is located; and performing HARQ feedback if the receiving end is located within the range of the $h^{th}$-layer geographical zone adjacent to the geographical zone in which the sending end is located; or skipping HARQ feedback if the receiving end is not located within the range of the $h^{th}$-layer geographical zone adjacent to the geographical zone in which the sending end is located; where
h is an integer greater than or equal to 1; and it should be noted that h is determined based on an implicitly indicated communication range.

Assuming that in the geographical zone division rule, the length and width of the geographical zone, the reuse factors of the length and width dimensions, a value Q of the relationship between the length and width of the geographical zone and the communication range, and the communication range each have four codepoints: 00, 01, 10, and 11. Corresponding values of the length and width are: 50 m, 100 m, 200 m, 400 m; corresponding values of the reuse factors of the length and width dimensions are: 1, 2, 4, 8; and corresponding values Q of the relationship between the length and width of the geographical zone and the communication range are: 1, 2, 4, and 8. It is assumed that a codepoint that is corresponding to the length and width of the geographical zone and carried in the SCI sent by the sending end to the receiving end is 00 (that is, 50 m); a codepoint corresponding to the reuse factors corresponding to the length and width dimensions is 10 (that is, 4); and a codepoint corresponding to the value Q of the relationship between the length and width of the geographical zone and the communication range is 01 (that is, 2). Assuming that the geographical zone identifier of the sending end is 10, all receiving ends located within this geographical zone and two-layer adjacent geographical zones of the geographical zone need to perform HARQ feedback. As shown in FIG. 4, the receiving end in the dashed box in FIG. 4 needs to perform HARQ feedback to the sending end.

It should be further noted that, in this case, the first information may further include: auxiliary indication information within a communication range, and the auxiliary indication information is used for determining at least one target zone within the communication range.

Specifically, the auxiliary indication information includes: a second target codepoint.

The second target codepoint is one of at least one second preset codepoint, and each codepoint in the at least one second preset codepoint corresponds to one target zone within a communication range.

For example, the auxiliary indication information may be one or more specific zones within the communication range; each specific zone may be indicated by one codepoint, and one codepoint may also indicate a plurality of specific zones. That is, the auxiliary indication information includes at least one preconfigured codepoint, and each codepoint corresponds to one or more specific zones within the communication range.

Specifically, in this case, after receiving the first information, the receiving end performs the following action:
the receiving end performs the following actions: determining, based on a geographical zone identifier of the receiving end and the geographical zone identifier of the sending end, whether the receiving end is located within a range of an $h^{th}$-layer geographical zone adjacent to a geographical zone in which the sending end is located; if the receiving end is located within the range of the $h^{th}$-layer geographical zone adjacent to the geographical zone in which the sending end is located, determining whether a location of the receiving end is within a range indicated by the auxiliary indication information; and performing HARQ feedback if the location of the receiving end is within the range indicated by the auxiliary indication information; otherwise, skipping HARQ feedback.

It should be noted that in this case, the receiving end needs to perform HARQ feedback to the sending end only when the receiving end is located not only within the implicitly determined communication range but also within the range indicated by the auxiliary indication information within the communication range; and the receiving end does not perform HARQ feedback provided that neither of the conditions is satisfied.

Figure 5:
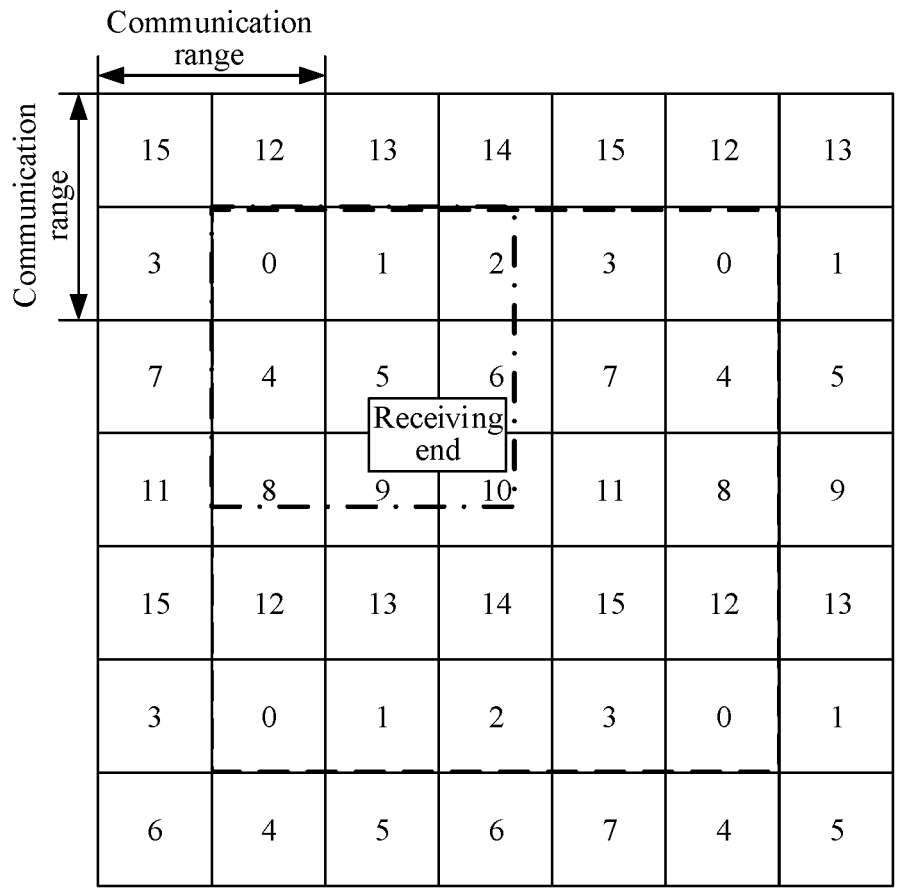
FIG. 5 is a fourth schematic diagram of a relationship between a location of a receiving end and a communication range indicated by a communication range indicator.

For example, on the basis of FIG. 2, if the SCI sent by the sending end to the receiving end also carries the auxiliary indication information within the communication range, and if an auxiliary indication correspondingly includes four codepoints 00, 01, 10, and 11, corresponding zones are four equally divided partial zones within the communication range in directions of upper left, upper right, lower left, and lower right. If the auxiliary indication information within the communication range carried in the SCI sent by the sending end to the receiving end indicates a codepoint of 00, as shown in FIG. 5, only receiving ends located within the dash-dotted zone in FIG. 5 need to perform HARQ feedback to the sending end.

Case 3. The first information includes: the coverage area identifier of the control node serving the sending end.

It should be noted that in this case, geographical locations are divided into zones, and the division rule is related to a coverage area identifier (for example, a cell ID of a base station) of a control node.

Specifically, it should be noted that in a case that a coverage range of one control node belongs to one geographical zone, before the sending first information to a receiving end, the following is further included: receiving information of a coverage area identifier of a control node that is sent by the control node by using second information.

Specifically, it should be noted that in a case that there are at least two geographical zones within a coverage range of one control node, before the sending first information to a receiving end, the following is further included: receiving a division rule of geographical zones within coverage of the control node and a division rule of geographical zones within coverage of each of neighboring control nodes, where the division rules are sent by using second information by the control node.

Specifically, the control node refers to a control node connected to the sending end.

It should be noted that the second information is indicated by using at least one of the following manners:
  system information (SI), radio resource control (RRC) information, medium access control control element (MAC CE), physical sidelink control information (SCI), downlink control information (DCI), and direct communication link feedback control information (SFCI).

It should be further noted that, if the sending end obtains at least two different coverage area identifiers, a coverage area identifier carried in the first information includes one of the following:
  a random one of the at least two coverage area identifiers; and
  a coverage area identifier corresponding to a first reference signal received power; where
  the first reference signal received power is a largest one of reference signal received powers corresponding to all coverage area identifiers.

Specifically, in this case, after receiving the first information, the receiving end performs the following action:
  based on the coverage area identifier of the control node serving the sending end and a coverage area identifier of a control node serving the receiving end, determining whether to perform HARQ feedback.

Specifically, a manner of determining whether to perform HARQ feedback includes one of the following:
  H11. if the coverage area identifier of the control node serving the sending end is the same as the coverage area identifier of the control node serving the receiving end, performing HARQ feedback; otherwise, skipping HARQ feedback;
  H12. if an absolute value of a difference between the coverage area identifier of the control node serving the sending end and the coverage area identifier of the control node serving the receiving end is less than a first preset threshold, performing HARQ feedback; otherwise, skipping HARQ feedback; and
  H13. if a result of a modulo operation on the coverage area identifier of the control node serving the sending end and the coverage area identifier of the control node serving the receiving end satisfies a second preset threshold, performing HARQ feedback; otherwise, skipping HARQ feedback.

It should be noted that the first preset threshold and the second preset threshold may be prescribed by the protocol, configured by the control node, or configured by the sending end.

Case 4: The first information includes: the coverage area identifier of the control node serving the sending end and the communication range indicator.

It should be noted that in this case, geographical locations are divided into zones, and the division rule is related to a coverage area identifier (for example, a cell ID of a base station) of a control node.

Specifically, it should be noted that in a case that a coverage range of one control node belongs to one geographical zone, before the sending first information to a receiving end, the following is further included: receiving information of a coverage area identifier of a control node that is sent by the control node by using second information.

Specifically, it should be noted that in a case that there are at least two geographical zones within a coverage range of one control node, before the sending first information to a receiving end, the following is further included: receiving a division rule of geographical zones within coverage of the control node and a division rule of geographical zones within coverage of each of neighboring control nodes, where the division rules are sent by using second information by the control node.

Specifically, the control node refers to a control node connected to the sending end.

It should be noted that the second information is indicated by using at least one of the following manners:
  system information, radio resource control information, a medium access control control element, physical sidelink control information, downlink control information, and direct communication link feedback control information.

It should be further noted that, if the sending end obtains at least two different coverage area identifiers, a coverage area identifier carried in the first information includes one of the following:
  a random one of the at least two coverage area identifiers; and
  a coverage area identifier corresponding to a first reference signal received power; where
  the first reference signal received power is a largest one of reference signal received powers corresponding to all coverage area identifiers.

Further, in this case, the communication range indicator is used for indicating a receiving-end zone for which HARQ feedback is required, and further, the communication range indicator is used for indicating at least one of the following:

I11. a layer index of a geographical zone covered by a control node, where the geographical zone is adjacent to a geographical zone that is covered by the control node and in which the sending end is located; and I12. a geographical distance between the sending end and the receiving end.

For example, the geographical distance is 50 m, that is, all receiving ends within 50 m from the sending end need to perform HARQ feedback.

It should be further noted that the communication range indicator includes one first target codepoint.

The first target codepoint is one of at least one first preset codepoint, and each codepoint in the at least one first preset codepoint corresponds to one communication range.

Specifically, in this case, after receiving the first information, the receiving end performs the following action:

based on the coverage area identifier of the control node serving the sending end and a coverage area identifier of a control node serving the receiving end, determining whether a geographical location of the receiving end meets a range indicated by the communication range indicator, and determining, based on a judgment result, whether to perform HARQ feedback.

Further, because information indicated by the communication range indicator is different, specific operations of the receiving end are also different. From the perspective of the information indicated by the communication range indicator, the following describes in detail specific implementation cases of determining, based on a judgment result, whether to perform HARQ feedback.

I21. The communication range indicator is used for indicating a layer index of a geographical zone covered by a control node, where the geographical zone is adjacent to a geographical zone that is covered by the control node and in which the sending end is located.

In this case, the receiving end implements one of the following cases:

I211. if the layer index is zero and the coverage area identifier of the control node serving the sending end is the same as the coverage area identifier of the control node serving the receiving end, performing HARQ feedback; or if the layer index is zero and the coverage area identifier of the control node serving the sending end is different from the coverage area identifier of the control node serving the receiving end, skipping HARQ feedback; and I212. if the layer index is non-zero, based on the coverage area identifier of the control node serving the sending end and the coverage area identifier of the control node serving the receiving end, determining whether the coverage range of the control node serving the receiving end is located within a range of an $m^{th}$-layer geographical zone adjacent to the coverage range of the control node serving the sending end; and if located within the range of the $m^{th}$-layer geographical zone, performing HARQ feedback; or if not located within the range of the $m^{th}$-layer geographical zone, skipping HARQ feedback; where m is an integer greater than or equal to 1.

I22. The communication range indicator is used for indicating the geographical distance between the sending end and the receiving end.

In this case, the receiving end implements one of the following cases:

I221. determining a third distance and a fourth distance based on positioning information of the receiving end and the coverage area identifier of the control node serving the sending end; and if the third distance is less than the geographical distance between the sending end and the receiving end, performing HARQ feedback, or if the fourth distance is less than the geographical distance between the sending end and the receiving end, performing HARQ feedback, or if an average value of the third distance and the fourth distance is less than the geographical distance between the sending end and the receiving end, performing HARQ feedback, where the third distance is greater than the fourth distance; where specifically, the third distance is a maximum value of the distance between the receiving end and the sending end, and the fourth distance is a minimum value of the distance between the receiving end and the sending end;

I222. obtaining a third target distance based on the positioning information of the receiving end and a fourth reference point of the coverage area of the control node serving the sending end; and if the third target distance is less than the geographical distance between the sending end and the receiving end, performing HARQ feedback; where for example, the fourth reference point is a center point of the geographical zone;

I223. obtaining a fourth target distance based on a fifth reference point of the coverage area of the control node serving the receiving end and a sixth reference point of the coverage area of the control node serving the sending end; and if the fourth target distance is less than the geographical distance between the sending end and the receiving end, performing HARQ feedback; where for example, the fifth reference point and the sixth reference point are both center points of the geographical zone; and I224. obtaining a second reference value based on the coverage area identifier of the control node serving the receiving end and the coverage area identifier of the control node serving the sending end; and if the second reference value is less than the geographical distance between the sending end and the receiving end, performing HARQ feedback; where for example, in this case, a difference or modulus value between the coverage area identifier of the control node serving the receiving end and the coverage area identifier of the control node serving the sending end is calculated, and then an operation is performed on the difference or modulus value and a specific amount (for example, the side length of the geographical zone) to obtain an operation result as the second reference value. If the second reference value is less than the geographical distance between the sending end and the receiving end, it indicates that the receiving end needs to perform HARQ feedback.

It should be further noted here that the coverage area identifier of the control node serving the receiving end is notified by a control node connected to the receiving end.

Case 5: The first information includes: the coverage area identifier of the control node serving the sending end, the communication range indicator, and the geographical zone identifier of the sending end.

It should be noted that in this case, geographical locations are divided into zones, and the division rule is related to a coverage area identifier (for example, a cell ID of a base station) of a control node.

Specifically, it should be noted that in a case that a coverage range of one control node belongs to one geographical zone, before the sending first information to a receiving end, the following is further included: receiving information of a coverage area identifier of a control node that is sent by the control node by using second information.

Specifically, it should be noted that in a case that there are at least two geographical zones within a coverage range of one control node, before the sending first information to a receiving end, the following is further included: receiving a division rule of geographical zones within coverage of the control node and a division rule of geographical zones within coverage of each of neighboring control nodes, where the division rules are sent by using second information by the control node.

Specifically, the control node refers to a control node connected to the sending end.

It should be noted that the second information is indicated by using at least one of the following manners:
   system information, radio resource control information, a medium access control control element, physical sidelink control information, downlink control information, and direct communication link feedback control information.

It should be further noted that, if the sending end obtains at least two different coverage area identifiers, a coverage area identifier carried in the first information includes one of the following:
   a random one of the at least two coverage area identifiers; and
   a coverage area identifier corresponding to a first reference signal received power; where
   the first reference signal received power is a largest one of reference signal received powers corresponding to all coverage area identifiers.

Further, in this case, the communication range indicator is used for indicating a receiving-end zone for which HARQ feedback is required, and further, the communication range indicator is used for indicating at least one of the following:
   J11. a layer index of a geographical zone adjacent to a geographical zone in which the sending end is located;
   J12. a geographical distance between the sending end and the receiving end; and
   J13. a relationship between the geographical zone identifier of the sending end and that of the receiving end.

It should be further noted that the communication range indicator includes one first target codepoint.

The first target codepoint is one of at least one first preset codepoint, and each codepoint in the at least one first preset codepoint corresponds to one communication range.

Specifically, in this case, after receiving the first information, the receiving end performs the following action:
   determining a location of the sending end based on the geographical zone identifier of the sending end and the coverage area identifier of the control node serving the sending end; and if a location of the receiving end is located within a range indicated by the communication range indicator, performing HARQ feedback.

Further, because the receiving end also needs to obtain its own geographical zone identifier in this case, the receiving end needs to obtain the division rule of geographical zones within the coverage range of the control node serving the receiving end and the division rule of geographical zones within coverage of each of the neighboring control nodes. Specifically, a specific implementation of determining a location of the sending end based on the geographical zone identifier of the sending end and the coverage area identifier of the control node serving the sending end; and performing HARQ feedback if the location of the receiving end is located within the range indicated by the communication range indicator is as follows:
   obtaining a division rule of geographical zones within a coverage range of a control node serving the receiving end and a division rule of geographical zones within coverage of each of neighboring control nodes; where the division rules are sent by the control node serving the receiving end; and
   according to the division rule of geographical zones within the coverage range of the control node serving the receiving end and the division rule of geographical zones within coverage of each of the neighboring control nodes, if a division rule of geographical zones within a coverage range of the control node serving the sending end is obtained, determining a location of the sending end according to the division rule of geographical zones within the coverage range of the control node serving the sending end and the division rule of geographical zones within the coverage range of the control node serving the receiving end, and based on the geographical zone identifier of the sending end and the coverage area identifier of the control node serving the sending end; and performing HARQ feedback if the location of the receiving end is located within the range indicated by the communication range indicator.

It should be further noted that, if the receiving end does not obtain the division rule of geographical zones within the coverage range of the control node serving the sending end, HARQ feedback is skipped or HARQ feedback is always performed.

It should be noted that the division rule of geographical zones within the coverage range of the control node serving the sending end may be the same as or different from the division rule of geographical zones within the coverage range of the control node serving the receiving end. Specifically, the receiving end determining, based on the communication range indicator, whether to perform HARQ feedback may be in different manners. The receiving end determining, based on the communication range indicator, whether to perform HARQ feedback is specifically described from different perspectives.

J21. The division rule of geographical zones within the coverage range of the control node serving the sending end is the same as the division rule of geographical zones within the coverage range of the control node serving the receiving end.

J211. The communication range indicator is used for indicating a layer index of a geographical zone adjacent to the geographical zone in which the sending end is located.

In this case, the receiving end implements one of the following cases:
   J2111. if the layer index is zero and the geographical zone identifier of the receiving end is the same as the geographical zone identifier of the sending end, performing HARQ feedback; or if the layer index is zero and the geographical zone identifier of the receiving end is different from the geographical zone identifier of the sending end, skipping HARQ feedback; and
   J2112. if the layer index is non-zero, determining, based on the geographical zone identifier of the receiving end and the geographical zone identifier of the sending end, whether the receiving end is located within a range of an $i^{th}$-layer geographical zone adjacent to the geographical zone in which the sending end is located; and if the receiving end is located within the range of the $i^{th}$-layer geographical zone, performing HARQ feedback; or if the receiving end is not located within the range of the $i^{th}$-layer geographical zone, skipping HARQ feedback; where i is an integer greater than or equal to 1.

J212. The communication range indicator is used for indicating the geographical distance between the sending end and the receiving end.

In this case, the receiving end implements one of the following cases:

J2121. determining a fifth distance and a sixth distance based on positioning information of the receiving end and the geographical zone identifier of the sending end; and if the fifth distance is less than the geographical distance between the sending end and the receiving end, performing HARQ feedback, or if the sixth distance is less than the geographical distance between the sending end and the receiving end, performing HARQ feedback, or if an average value of the fifth distance and the sixth distance is less than the geographical distance between the sending end and the receiving end, performing HARQ feedback, where the fifth distance is greater than the sixth distance; where specifically, the fifth distance is a maximum value of the distance between the receiving end and the sending end, and the sixth distance is a minimum value of the distance between the receiving end and the sending end;

J2122. obtaining a fourth target distance based on the positioning information of the receiving end and a seventh reference point of a geographical zone in which the sending end is located; and if the fourth target distance is less than the geographical distance between the sending end and the receiving end, performing HARQ feedback; where for example, the seventh reference point is a center point of the geographical zone;

J2123. obtaining a fifth target distance based on an eighth reference point of a geographical zone in which the receiving end is located and a ninth reference point of the geographical zone in which the sending end is located; and if the fifth target distance is less than the geographical distance between the sending end and the receiving end, performing HARQ feedback; where for example, the eighth reference point and the ninth reference point are both center points of the geographical zone; and J2124. obtaining a third reference value based on a geographical zone identifier of the receiving end and the geographical zone identifier of the sending end; and if the third reference value is less than the geographical distance between the sending end and the receiving end, performing HARQ feedback.

For example, in this case, a difference or modulus value between the geographical zone identifier of the receiving end and the geographical zone identifier of the sending end is calculated, and then an operation is performed on the difference or modulus value and a specific amount (for example, the side length of the geographical zone) to obtain an operation result as the third reference value. If the third reference value is less than the geographical distance between the sending end and the receiving end, it indicates that the receiving end needs to perform HARQ feedback.

J213. The communication range indicator is used for indicating the relationship between the geographical zone identifier of the sending end and that of the receiving end.

In this case, the receiving end implements one of the following cases:

J2131. when the relationship between the geographical zone identifier of the sending end and that of the receiving end is a difference threshold for the geographical zone identifiers, if an absolute value of a difference between the geographical zone identifier of the sending end and that of the receiving end is less than the difference threshold, performing HARQ feedback; and J2132. when the relationship between the geographical zone identifier of the sending end and that of the receiving end is a third threshold obtained through a modular operation on geographical zone identifiers, and if a result of a modular operation on the geographical zone identifiers of the sending end and the receiving end meets a requirement of the third threshold, performing HARQ feedback.

For example, a modular operation is performed on the geographical zone identifiers between the sending end and the receiving end to obtain an operation result. If the operation result is less than the third threshold, it indicates that the receiving end needs to perform HARQ feedback, or if the operation result is greater than the third threshold, it indicates that the receiving end needs to perform HARQ feedback.

J22. The division rule of geographical zones within the coverage range of the control node serving the sending end is different from the division rule of geographical zones within the coverage range of the control node serving the receiving end.

J221. The communication range indicator is used for indicating a layer index of a geographical zone adjacent to the geographical zone in which the sending end is located.

In this case, the receiving end implements one of the following cases:

J2211. if the layer index is zero, when the coverage area identifier of the control node serving the sending end is the same as the coverage area identifier of the control node serving the receiving end, and the geographical zone identifier of the receiving end is the same as the geographical zone identifier of the sending end, performing HARQ feedback; or if the layer index is zero, when the coverage area identifier of the control node serving the sending end is different from the coverage area identifier of the control node serving the receiving end, skipping HARQ feedback; and J2212. if the layer index is non-zero, when the coverage area identifier of the control node serving the sending end is the same as the coverage area identifier of the control node serving the receiving end, determining, based on the geographical zone identifier of the receiving end and the geographical zone identifier of the sending end, whether the receiving end is located within a range of a $j^{th}$-layer geographical zone adjacent to the geographical zone in which the sending end is located; and if the receiving end is located within the range of the $j^{th}$-layer geographical zone, performing HARQ feedback, or if the receiving end is not located within the range of the $j^{th}$-layer geographical zone, skipping HARQ feedback; where j is an integer greater than or equal to 1.

J222. The communication range indicator is used for indicating the geographical distance between the sending end and the receiving end.

In this case, the receiving end implements one of the following cases:

J2221. determining a seventh distance and an eighth distance based on positioning information of the receiving end, the geographical zone identifier of the sending end, and the coverage area identifier of the control node serving the sending end; and if the seventh distance is less than the geographical distance between the sending end and the receiving end, performing HARQ feedback, or if the eighth distance is less than the geographical distance between the sending end and the receiving end, performing HARQ feedback, or if an average value of the seventh distance and the eighth distance is less than the geographical distance between the sending end and the receiving end, performing HARQ feedback, where the seventh distance is greater than the eighth distance; and specifically, the seventh distance is a maximum value of the distance between the receiving end and the sending end, and the eighth distance is a minimum value of the distance between the receiving end and the sending end;

J2222. obtaining a sixth target distance based on the positioning information of the receiving end, the coverage area identifier of the control node serving the sending end, and a tenth reference point of the geographical zone in which the sending end is located; and if the sixth target distance is less than the geographical distance between the sending end and the receiving end, performing HARQ feedback; where for example, the tenth reference point is a center point of the geographical zone;

J2223. obtaining a seventh target distance based on an eleventh reference point of the geographical zone in which the receiving end is located, the coverage area identifier of the control node serving the sending end, and a twelfth reference point of the geographical zone in which the sending end is located; and if the seventh target distance is less than the geographical distance between the sending end and the receiving end, performing HARQ feedback; where for example, the eleventh reference point and the twelfth reference point are both center points of the geographical zone; and J2224. obtaining a fourth reference value based on the geographical zone identifier of the receiving end, the geographical zone identifier of the sending end, and the coverage area identifier of the control node serving the sending end; and if the fourth reference value is less than the geographical distance between the sending end and the receiving end, performing HARQ feedback.

For example, in this case, a difference or modulus value between the geographical zone identifier of the receiving end and the geographical zone identifier of the sending end is calculated, and then an operation is performed on the difference or modulus value and a specific amount (for example, the side length of the geographical zone) to obtain an operation result as the fourth reference value. If the fourth reference value is less than the geographical distance between the sending end and the receiving end, it indicates that the receiving end needs to perform HARQ feedback.

J223. The communication range indicator is used for indicating the relationship between the geographical zone identifier of the sending end and that of the receiving end.

In this case, the receiving end implements one of the following cases:

J2231. when the relationship between the geographical zone identifier of the sending end and that of the receiving end is a difference threshold for the geographical zone identifiers, if an absolute value of a difference between the geographical zone identifier of the sending end and that of the receiving end is less than the difference threshold, performing HARQ feedback; and J2232. when the relationship between the geographical zone identifier of the sending end and that of the receiving end is a third threshold obtained through a modular operation on geographical zone identifiers, and if a result of a modular operation on the geographical zone identifiers of the sending end and the receiving end meets a requirement of the third threshold, performing HARQ feedback.

It should be noted that, in the foregoing cases 3 to 5, if the coverage area identifier of the control node serving the sending end is identified as the first preset codepoint, the receiving end does not perform HARQ feedback or always performs HARQ feedback.

It should be noted that, in the foregoing cases 3 to 5, if the receiving end is in an idle state, HARQ feedback is not performed or HARQ feedback is always performed.

It should be noted that, in the foregoing cases 1, 4, and 5, the first information needs to transmit the communication range indicator, if there is at least one communication range for a multiplexed service packet in one transport block, the communication range indicator satisfies at least one of the following conditions:

X11. if at least one communication range is the same, the communication range indicator is used for indicating one communication range;

X12. if at least part of the at least one communication range is different, the communication range indicator is used for indicating a minimum value of the at least one communication range;

X13. if at least part of the at least one communication range is different, the communication range indicator is used for indicating a maximum value of the at least one communication range;

X14. if at least part of the at least one communication range is different, the communication range indicator is used for indicating an average value of the at least one communication range;

X15. if at least part of the at least one communication range is different, the communication range indicator is used for indicating a communication range value that is closest to an average value of the at least one communication range; where for example, when at least one communication range includes four values: 20 m, 50 m, 80 m, and 100 m, and an average value of these four values is 62.5 m, 50 m closest to 62.5 m is selected as the communication range indicated by the communication range indicator; and X16. a communication range indicated in the communication range indicator is determined based on a service quality parameter.

It should be further noted that the terminal obtains first sidelink information, and the first sidelink information includes at least one of hybrid automatic repeat request acknowledgment (HARQ-ACK), a channel state information (CSI) report, and a scheduling request (SR) that are corresponding to sidelink transmission between the terminal and other terminals. Optionally, the terminal may be a sending or receiving terminal, which is not limited herein.

Y11. After obtaining the first sidelink information, the terminal may further optionally send target information to the control node on a target resource.

Case 1: A first resource on uplink, such as a physical uplink control information (PUCCH) or physical uplink shared information (PUSCH) resource, is used to transmit the first sidelink information.

It should be noted that in this case, a Uu link is used to connect the control node and the terminal.

Specifically, a second resource on the uplink, such as a PUCCH or PUSCH resource, is used to transmit uplink information, where the uplink information is at least one of a HARQ-ACK, a CSI report and an SR corresponding to Uu link transmission between the control node and the terminal.

Further, if the first resource and the second resource overlap, the user behavior in this case includes at least one of the following:

11. Determine the target resource based on types of the first resource and the second resource.

Optionally, when one of the first resource and the second resource is PUCCH and the other is PUSCH, it is determined that the PUSCH is the target resource.

12. Determine target information based on the types of the first resource and the second resource, including one of the following:
    discarding information corresponding to the PUCCH.

For example, the first resource is a PUCCH and the second resource is a PUSCH. In this case, the first sidelink information is discarded, and the target information is uplink information.

For another example, the first resource is a PUSCH and the second resource is a PUCCH. In this case, the uplink information is discarded, and the target information is the first sidelink information.

The target information is information obtained by multiplexing the first sidelink information and the uplink information.

For example, the first resource is a PUCCH and the second resource is a PUSCH. In this case, the target information is the information obtained by multiplexing the first sidelink information and the uplink information.

More specifically, for example, the first resource is a PUCCH and the second resource is a PUSCH, the PUSCH is determined as the target resource, and multiplexed information obtained by multiplexing the first sidelink information and the uplink information is sent on the PUSCH.

Case 2: A third resource on sidelink, such as a PSFCH or PSSCH resource, is used to transmit the first sidelink information.

It should be noted that in this case, a sidelink is used to connect the control node and the terminal.

A fourth resource on the sidelink, such as a PSFCH or PSSCH resource, is used to transmit second sidelink information, where the second sidelink information is at least one of a HARQ-ACK, a CSI report and an SR corresponding to sidelink transmission between the terminal and the control node.

Further, if the third resource and the fourth resource overlap, the user behavior in this case includes at least one of the following:

Determine the target resource based on the types of the third resource and the fourth resource.

Optionally, when one of the third resource and the fourth resource is a PSFCH and the other is a PSSCH, it is determined that the PSSCH is the target resource.

Determine target information based on the types of the third resource and the fourth resource, including one of the following:
    Discard information corresponding to the PSFCH.

For example, the third resource is a PSFCH and the fourth resource is a PSSCH. In this case, the first sidelink information is discarded, and the target information is the second sidelink information For another example, the first resource is a PSSCH and the second resource is a PSFCH. In this case, the second sidelink information is discarded, and the target information is the first sidelink information.

The target information is information obtained by multiplexing the first sidelink information and the second sidelink information.

For example, the third resource is a PSFCH, the fourth resource is a PSSCH, and the target information is information obtained by multiplexing the first sidelink information and the second sidelink information. More specifically, for example, the third resource is a PSFCH, and the fourth resource is a PSSCH, the PSSCH is determined as the target resource, and multiplexed information obtained by multiplexing the first sidelink information and the second sidelink information is sent on the PSSCH.

It should be noted that a manner of obtaining the first resource, the second resource, the third resource, and the fourth resource includes at least one of being configured by a control node, being prescribed by a protocol, being pre-configured, being negotiated between terminals, and being indicated by other terminals. Different resources may be obtained in different manners.

It should be noted that the types of the first resource and the second resource may be the same or different, which is not limited herein. The types of the third resource and the fourth resource may be the same or different, which is not limited herein.

It should be noted that this disclosure provides several types of geographical region division rules and content of information carried by corresponding SCI, and defines behaviors of the receiving end, so as to resolve the problem that carrying coordinate information for real-time positioning of users in the related art causes large signaling overheads. In addition, this can resolve the problem of excessive feedback overheads and increasing interference caused by HARQ feedback from remote receiving ends in current groupcast communication. Based on content carried in the first information, the sending end can accurately determine whether to perform HARQ feedback, thereby reducing communication overheads.

Figure 6:
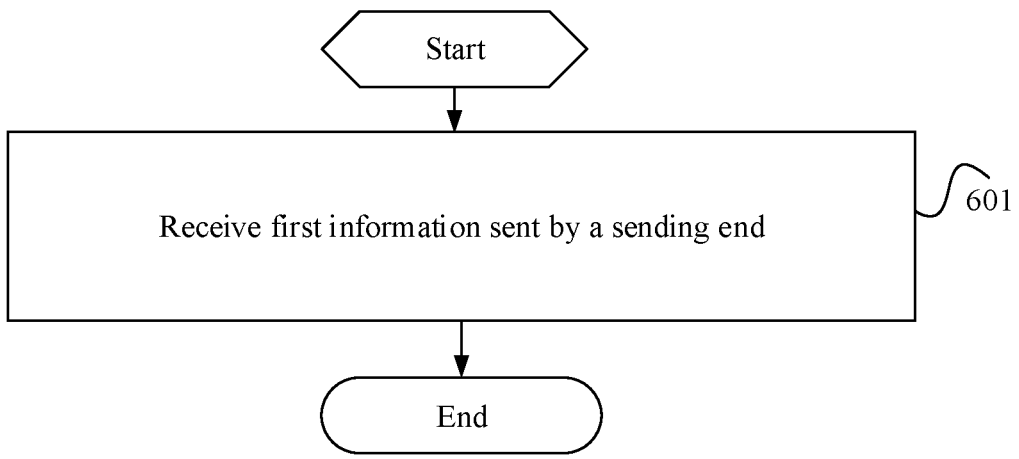
FIG. 6 is a schematic flowchart of an information receiving method applied to a receiving end according to an embodiment of this disclosure.

As shown in FIG. 6, an embodiment of this disclosure provides an information receiving method, applied to a receiving end and including:

Step 601: Receive first information sent by a sending end.

The first information is used to assist the receiving end in determining whether to perform hybrid automatic repeat request HARQ feedback; and
    the first information includes at least one of the following:
        a communication range indicator, a correspondence between side lengths of geographical zones and communication ranges, a geographical zone division rule, and a coverage area identifier of a control node serving the sending end.

Specifically, the communication range indicator is used for indicating a receiving-end zone for which HARQ feedback is required.

The communication range indicator is used for indicating at least one of the following:
- a layer index of a geographical zone adjacent to a geographical zone in which the sending end is located;
- a layer index of a geographical zone covered by a control node, where the geographical zone is adjacent to a geographical zone that is covered by the control node and in which the sending end is located;
- a geographical distance between the sending end and the receiving end; and
- a relationship between a geographical zone identifier of the sending end and that of the receiving end.

Specifically, the communication range indicator includes one first target codepoint.

The first target codepoint is one of at least one first preset codepoint, and each codepoint in the at least one first preset codepoint corresponds to one communication range.

Optionally, when the first information includes the communication range indicator; or when the first information includes the geographical zone division rule and the correspondence between side lengths of geographical zones and communication ranges, the first information further includes: a geographical zone identifier of the sending end and auxiliary indication information within a communication range, where the auxiliary indication information is used for determining at least one target zone within the communication range.

Optionally, when the first information includes the communication range indicator, and the first information further includes a geographical zone identifier of the sending end, after the receiving first information sent by a sending end, the following is further included:
- determining a geographical zone identifier of the receiving end according to a target division rule of geographical zone.

Specifically, the target division rule includes:
- a correspondence between geographical zone division granularities and target communication ranges; and
- a geographical zone identifier calculation manner; where the target communication range is at least one fixed value prescribed by a protocol.

Optionally, when the first information includes the correspondence between side lengths of geographical zones and communication ranges and the geographical zone division rule; or when the first information includes the correspondence between side lengths of geographical zones and communication ranges and the geographical zone division rule, and the first information further includes auxiliary indication information within a communication range, the first information further includes: a geographical zone identifier of the sending end; and After the receiving first information sent by a sending end, the following is further included:
- determining a geographical zone identifier of the receiving end according to the geographical zone division rule.

Specifically, the geographical zone division rule is determined by a communication range of each transmission.

The geographical zone division rule includes:
- side length indication information of a geographical zone;
- per-dimension reuse factor indication information of the geographical zone; and
- a geographical zone identifier calculation manner.

Specifically, the auxiliary indication information includes:
- a second target codepoint; where
- the second target codepoint is one of at least one second preset codepoint, and each codepoint in the at least one second preset codepoint corresponds to one target zone within a communication range.

Optionally, when the first information includes the communication range indicator, and the first information further includes a geographical zone identifier of the sending end, after the receiving first information sent by a sending end, the information receiving method further includes:
- determining, based on the geographical zone identifier of the sending end and the communication range indicator, whether the receiving end is located within a range indicated by the communication range indicator;
- if the receiving end is located within the range indicated by the communication range indicator, performing HARQ feedback.

Optionally, when the first information includes the communication range indicator, and the first information further includes a geographical zone identifier of the sending end and auxiliary indication information within a communication range, after the receiving first information sent by a sending end, the information receiving method further includes:
- determining, based on the geographical zone identifier of the sending end and the communication range indicator, whether the receiving end is located within a range indicated by the communication range indicator;
- if the receiving end is located within the range indicated by the communication range indicator, determining, based on the auxiliary indication information within the communication range, whether the receiving end is located within a range indicated by the auxiliary indication information within the communication range; and
- if the receiving end is located within the range indicated by the auxiliary indication information within the communication range, performing HARQ feedback.

Further, when the communication range indicator is used for indicating a layer index of a geographical zone adjacent to a geographical zone in which the sending end is located, the determining, based on the geographical zone identifier of the sending end and the communication range indicator, whether the receiving end is located within a range indicated by the communication range indicator includes one of the following:
- if the layer index is zero and a geographical zone identifier of the receiving end is the same as the geographical zone identifier of the sending end, the receiving end is located within the range indicated by the communication range indicator;
- if the layer index is zero and the geographical zone identifier of the receiving end is different from the geographical zone identifier of the sending end, the receiving end is located beyond the range indicated by the communication range indicator; and
- if the layer index is non-zero, determining, based on the geographical zone identifier of the receiving end and the geographical zone identifier of the sending end, whether the receiving end is located within a range of an $n^{th}$-layer geographical zone adjacent to the geographical zone in which the sending end is located, where if located within the range of the $n^{th}$-layer geographical zone, the receiving end is located within the range indicated by the communication range indicator; or if not located within the range of the $n^{th}$-layer geographical zone, the receiving end is not located within the range indicated by the communication range indicator; where n is an integer greater than or equal to 1.

Further, when the communication range indicator is used for indicating a geographical distance between the sending end and the receiving end, the determining, based on the geographical zone identifier of the sending end and the communication range indicator, whether the receiving end is located within a range indicated by the communication range indicator includes one of the following:

determining a first distance and a second distance based on positioning information of the receiving end and the geographical zone identifier of the sending end, where if the first distance is less than the geographical distance between the sending end and the receiving end, the receiving end is located within the range indicated by the communication range indicator, or if the second distance is less than the geographical distance between the sending end and the receiving end, the receiving end is located within the range indicated by the communication range indicator, or if an average value of the first distance and the second distance is less than the geographical distance between the sending end and the receiving end, the receiving end is located within the range indicated by the communication range indicator, where the first distance is greater than the second distance;

obtaining a first target distance based on the positioning information of the receiving end and a first reference point of the geographical zone in which the sending end is located, where if the first target distance is less than the geographical distance between the sending end and the receiving end, the receiving end is located within the range indicated by the communication range indicator;

obtaining a second target distance based on a second reference point of a geographical zone in which the receiving end is located and a third reference point of the geographical zone in which the sending end is located, where if the second target distance is less than the geographical distance between the sending end and the receiving end, the receiving end is located within the range indicated by the communication range indicator; and obtaining a first reference value based on a geographical zone identifier of the receiving end and the geographical zone identifier of the sending end, where if the first reference value is less than the geographical distance between the sending end and the receiving end, the receiving end is located within the range indicated by the communication range indicator.

Further, when the communication range indicator is used for indicating a relationship between a geographical zone identifier of the sending end and that of the receiving end, the determining, based on the geographical zone identifier of the sending end and the communication range indicator, whether the receiving end is located within a range indicated by the communication range indicator includes one of the following:

when the relationship between the geographical zone identifier of the sending end and that of the receiving end is a difference threshold for the geographical zone identifiers, if an absolute value of a difference between the geographical zone identifier of the sending end and that of the receiving end is less than the difference threshold, the receiving end is located within the range indicated by the communication range indicator; and when the relationship between the geographical zone identifier of the sending end and that of the receiving end is a first threshold obtained through a modular operation on geographical zone identifiers, and if a result of a modular operation on the geographical zone identifiers of the sending end and the receiving end meets a requirement of the first threshold, the receiving end is located within the range indicated by the communication range indicator.

Optionally, in a case that the first information includes: the correspondence between side lengths of geographical zones and communication ranges and the geographical zone division rule, and the first information further includes a geographical zone identifier of the sending end, the information receiving method further includes:

determining, based on a geographical zone identifier of the receiving end and the geographical zone identifier of the sending end, whether the receiving end is located within a range of an $h^{th}$-layer geographical zone adjacent to a geographical zone in which the sending end is located; and performing HARQ feedback if the receiving end is located within the range of the $h^{th}$-layer geographical zone adjacent to the geographical zone in which the sending end is located; where h is an integer greater than or equal to 1.

Further, the first information further includes auxiliary indication information within a communication range, and the performing HARQ feedback if the receiving end is located within the range of the $h^{th}$-layer geographical zone adjacent to the geographical zone in which the sending end is located includes:

if the receiving end is located within the range of the $h^{th}$-layer geographical zone adjacent to the geographical zone in which the sending end is located, determining whether a location of the receiving end is within a range indicated by the auxiliary indication information; and if the location of the receiving end is within the range indicated by the auxiliary indication information, performing HARQ feedback.

Optionally, in a case that the first information includes the coverage area identifier of the control node serving the sending end, the information receiving method further includes:

based on the coverage area identifier of the control node serving the sending end and a coverage area identifier of a control node serving the receiving end, determining whether to perform HARQ feedback.

Further, the determining whether to perform HARQ feedback includes one of the following:

if the coverage area identifier of the control node serving the sending end is the same as the coverage area identifier of the control node serving the receiving end, performing HARQ feedback;

if an absolute value of a difference between the coverage area identifier of the control node serving the sending end and the coverage area identifier of the control node serving the receiving end is less than a first preset threshold, performing HARQ feedback; and if a result of a modulo operation on the coverage area identifier of the control node serving the sending end and the coverage area identifier of the control node serving the receiving end satisfies a second preset threshold, performing HARQ feedback.

Optionally, when the first information includes the coverage area identifier of the control node serving the sending end and the communication range indicator, the information receiving method further includes:

based on the coverage area identifier of the control node serving the sending end and a coverage area identifier of a control node serving the receiving end, determining whether a geographical location of the receiving end meets a range indicated by the communication range indicator, and determining, based on a judgment result, whether to perform HARQ feedback.

Further, when the communication range indicator is used for indicating a layer index of a geographical zone covered by a control node, where the geographical zone is adjacent to a geographical zone that is covered by the control node and in which the sending end is located, the determining, based on a judgment result, whether to perform HARQ feedback includes one of the following:

if the layer index is zero and the coverage area identifier of the control node serving the sending end is the same as the coverage area identifier of the control node serving the receiving end, performing HARQ feedback; and if the layer index is non-zero, based on the coverage area identifier of the control node serving the sending end and the coverage area identifier of the control node serving the receiving end, determining whether a coverage range of the control node serving the receiving end is located within a range of an $m^{th}$-layer geographical zone adjacent to a coverage range of the control node serving the sending end; and if located within the range of the $m^{th}$-layer geographical zone, performing HARQ feedback; where m is an integer greater than or equal to 1.

Further, when the communication range indicator is used for indicating a geographical distance between the sending end and the receiving end, the determining, based on a judgment result, whether to perform HARQ feedback includes one of the following:

determining a third distance and a fourth distance based on positioning information of the receiving end and the coverage area identifier of the control node serving the sending end; and if the third distance is less than the geographical distance between the sending end and the receiving end, performing HARQ feedback, or if the fourth distance is less than the geographical distance between the sending end and the receiving end, performing HARQ feedback, or if an average value of the third distance and the fourth distance is less than the geographical distance between the sending end and the receiving end, performing HARQ feedback, where the third distance is greater than the fourth distance;

obtaining a third target distance based on the positioning information of the receiving end and a fourth reference point of the coverage area of the control node serving the sending end; and if the third target distance is less than the geographical distance between the sending end and the receiving end, performing HARQ feedback;

obtaining a fourth target distance based on a fifth reference point of the coverage area of the control node serving the receiving end and a sixth reference point of the coverage area of the control node serving the sending end; and if the fourth target distance is less than the geographical distance between the sending end and the receiving end, performing HARQ feedback; and obtaining a second reference value based on the coverage area identifier of the control node serving the receiving end and the coverage area identifier of the control node serving the sending end; and if the second reference value is less than the geographical distance between the sending end and the receiving end, performing HARQ feedback.

Optionally, in a case that the first information includes the coverage area identifier of the control node serving the sending end and the communication range indicator, and the first information further includes a geographical zone identifier of the sending end, the information receiving method further includes:

determining a location of the sending end based on the geographical zone identifier of the sending end and the coverage area identifier of the control node serving the sending end; and if a location of the receiving end is located within a range indicated by the communication range indicator, performing HARQ feedback.

Further, the determining a location of the sending end based on the geographical zone identifier of the sending end and the coverage area identifier of the control node serving the sending end; and if a location of the receiving end is located within a range indicated by the communication range indicator, performing HARQ feedback includes:

obtaining a division rule of geographical zones within a coverage range of a control node serving the receiving end and a division rule of geographical zones within coverage of each of neighboring control nodes; where the division rules are sent by the control node serving the receiving end; and according to the division rule of geographical zones within the coverage range of the control node serving the receiving end and the division rule of geographical zones within coverage of each of the neighboring control nodes, if a division rule of geographical zones within a coverage range of the control node serving the sending end is obtained, determining a location of the sending end according to the division rule of geographical zones within the coverage range of the control node serving the sending end and the division rule of geographical zones within the coverage range of the control node serving the receiving end, and based on the geographical zone identifier of the sending end and the coverage area identifier of the control node serving the sending end; and performing HARQ feedback if the location of the receiving end is located within the range indicated by the communication range indicator.

Specifically, if the division rule of geographical zones within the coverage range of the control node serving the sending end is the same as the division rule of geographical zones within the coverage range of the control node serving the receiving end, when the communication range indicator is used for indicating a layer index of a geographical zone adjacent to a geographical zone in which the sending end is located, the performing HARQ feedback if the location of the receiving end is located within the range indicated by the communication range indicator includes at least one of the following:

if the layer index is zero and a geographical zone identifier of the receiving end is the same as the geographical zone identifier of the sending end, performing HARQ feedback; and if the layer index is non-zero, determining, based on the geographical zone identifier of the receiving end and the geographical zone identifier of the sending end, whether the receiving end is located within a range of an $i^{th}$-layer geographical zone adjacent to the geographical zone in which the sending end is located; and if the receiving end is located within the range of the $i^{th}$-layer geographical zone, performing HARQ feedback; where i is an integer greater than or equal to 1.

Specifically, if the division rule of geographical zones within the coverage range of the control node serving the sending end is the same as the division rule of geographical zones within the coverage range of the control node serving the receiving end, when the communication range indicator is a geographical distance between the sending end and the receiving end, the performing HARQ feedback if the location of the receiving end is located within the range indicated by the communication range indicator includes at least one of the following:

determining a fifth distance and a sixth distance based on positioning information of the receiving end and the geographical zone identifier of the sending end; and if the fifth distance is less than the geographical distance between the sending end and the receiving end, performing HARQ feedback, or if the sixth distance is less than the geographical distance between the sending end and the receiving end, performing HARQ feedback, or if an average value of the fifth distance and the sixth distance is less than the geographical distance between the sending end and the receiving end, performing HARQ feedback, where the fifth distance is greater than the sixth distance;

obtaining a fourth target distance based on the positioning information of the receiving end and a seventh reference point of a geographical zone in which the sending end is located; and if the fourth target distance is less than the geographical distance between the sending end and the receiving end, performing HARQ feedback;

obtaining a fifth target distance based on an eighth reference point of a geographical zone in which the receiving end is located and a ninth reference point of the geographical zone in which the sending end is located; and if the fifth target distance is less than the geographical distance between the sending end and the receiving end, performing HARQ feedback; and obtaining a third reference value based on a geographical zone identifier of the receiving end and the geographical zone identifier of the sending end; and if the third reference value is less than the geographical distance between the sending end and the receiving end, performing HARQ feedback.

Specifically, if the division rule of geographical zones within the coverage range of the control node serving the sending end is different from the division rule of geographical zones within the coverage range of the control node serving the receiving end, when the communication range indicator is used for indicating a layer index of a geographical zone adjacent to a geographical zone in which the sending end is located, the performing HARQ feedback if the location of the receiving end is located within the range indicated by the communication range indicator includes at least one of the following:

if the layer index is zero, when the coverage area identifier of the control node serving the sending end is the same as the coverage area identifier of the control node serving the receiving end, and the geographical zone identifier of the receiving end is the same as the geographical zone identifier of the sending end, performing HARQ feedback; and if the layer index is non-zero, when the coverage area identifier of the control node serving the sending end is the same as the coverage area identifier of the control node serving the receiving end, determining, based on the geographical zone identifier of the receiving end and the geographical zone identifier of the sending end, whether the receiving end is located within a range of a $j^{th}$-layer geographical zone adjacent to the geographical zone in which the sending end is located; and if the receiving end is located within the range of the $j^{th}$-layer geographical zone, performing HARQ feedback; where j is an integer greater than or equal to 1.

Specifically, if the division rule of geographical zones within the coverage range of the control node serving the sending end is different from the division rule of geographical zones within the coverage range of the control node serving the receiving end, when the communication range indicator is a geographical distance between the sending end and the receiving end, the performing HARQ feedback if the location of the receiving end is located within the range indicated by the communication range indicator includes at least one of the following:

determining a seventh distance and an eighth distance based on positioning information of the receiving end, the geographical zone identifier of the sending end, and the coverage area identifier of the control node serving the sending end; and if the seventh distance is less than the geographical distance between the sending end and the receiving end, performing HARQ feedback, or if the eighth distance is less than the geographical distance between the sending end and the receiving end, performing HARQ feedback, or if an average value of the seventh distance and the eighth distance is less than the geographical distance between the sending end and the receiving end, performing HARQ feedback, where the seventh distance is greater than the eighth distance;

obtaining a sixth target distance based on the positioning information of the receiving end, the coverage area identifier of the control node serving the sending end, and a tenth reference point of the geographical zone in which the sending end is located; and if the sixth target distance is less than the geographical distance between the sending end and the receiving end, performing HARQ feedback;

obtaining a seventh target distance based on an eleventh reference point of the geographical zone in which the receiving end is located, the coverage area identifier of the control node serving the sending end, and a twelfth reference point of the geographical zone in which the sending end is located; and if the seventh target distance is less than the geographical distance between the sending end and the receiving end, performing HARQ feedback; and obtaining a fourth reference value based on the geographical zone identifier of the receiving end, the geographical zone identifier of the sending end, and the coverage area identifier of the control node serving the sending end; and if the fourth reference value is less than the geographical distance between the sending end and the receiving end, performing HARQ feedback.

Specifically, if the division rule of geographical zones within the coverage range of the control node serving the sending end is different from the division rule of geographical zones within the coverage range of the control node serving the receiving end, when the communication range indicator is a relationship between the geographical zone identifier of the sending end and that of the receiving end; or if the division rule of geographical zones within the coverage range of the control node serving the sending end is the same as the division rule of geographical zones within the coverage range of the control node serving the receiving end, when the communication range indicator is a relationship between the geographical zone identifier of the sending end and that of the receiving end, the performing HARQ feedback if the location of the receiving end is located within the range indicated by the communication range indicator includes at least one of the following:

when the relationship between the geographical zone identifier of the sending end and that of the receiving end is a difference threshold for the geographical zone identifiers, if an absolute value of a difference between the geographical zone identifier of the sending end and that of the receiving end is less than the difference threshold, performing HARQ feedback; and when the relationship between the geographical zone identifier of the sending end and that of the receiving end is a third threshold obtained through a modular operation on geographical zone identifiers, and if a result of a modular operation on the geographical zone identifiers of the sending end and the receiving end meets a requirement of the third threshold, performing HARQ feedback.

Optionally, after the obtaining a division rule of geographical zones within a coverage range of a control node serving the receiving end and a division rule of geographical zones within coverage of each of neighboring control nodes, where the division rules are sent by the control node serving the receiving end, the following is further included:

if the receiving end does not obtain the division rule of geographical zones within the coverage range of the control node serving the sending end, skipping HARQ feedback or always performing HARQ feedback.

Optionally, the information receiving method further includes:

if the coverage area identifier of the control node serving the sending end is a first preset codepoint, skipping HARQ feedback or always performing HARQ feedback.

Optionally, the information receiving method further includes:

if the receiving end is in an idle state, skipping HARQ feedback or always performing HARQ feedback.

It should be noted that all the descriptions of the receiving end in the foregoing embodiment are applicable to the embodiment of the information receiving method, with the same technical effects achieved.

Figure 7:
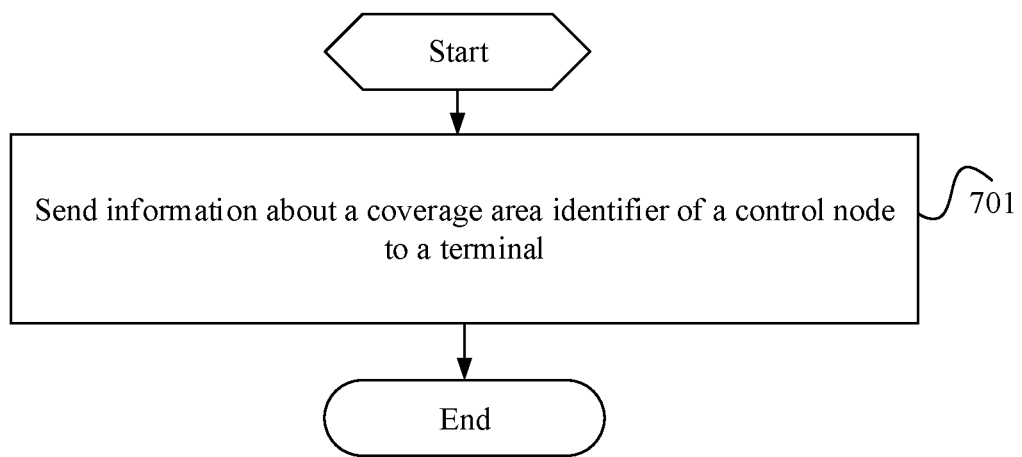
FIG. 7 is a schematic flowchart of an information sending method applied to a control node according to an embodiment of this disclosure.

As shown in FIG. 7, an embodiment of this disclosure provides an information sending method, applied to a control node and including:

Step 701: Send information about a coverage area identifier of the control node to a terminal.

The terminal is a receiving end or a sending end.

Further, in a case that there are at least two geographical zones within a coverage range of one control node, the information sending method further includes:

sending a division rule of geographical zones within coverage of the control node and a division rule of geographical zones within coverage of each of neighboring control nodes.

Optionally, the information sending method further includes:

determining a geographical zone identifier of the terminal based on location information of the terminal; and sending the geographical zone identifier to the terminal.

It should be noted that all the descriptions of the control node in the foregoing embodiment are applicable to the embodiment of the information sending method, with the same technical effects achieved.

Figure 8:
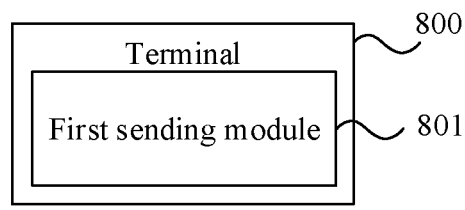
FIG. 8 is a first schematic modular diagram of a terminal according to an embodiment of this disclosure.

As shown in FIG. 8, an embodiment of this disclosure provides a terminal 800, where the terminal is a sending end and includes:

a first sending module 801, configured to send first information to a receiving end, where the first information is used to assist the receiving end in determining whether to perform hybrid automatic repeat request HARQ feedback; and the first information includes at least one of the following: a communication range indicator, a correspondence between side lengths of geographical zones and communication ranges, a geographical zone division rule, and a coverage area identifier of a control node serving the sending end.

Specifically, the first information is indicated by using at least one of the following manners:

physical sidelink control information;

direct communication interface radio resource control information; and a medium access control control element.

Optionally, when the first information includes the communication range indicator, the first information further includes: a geographical zone identifier of the sending end, and a manner of determining the geographical zone identifier is:

determining the geographical zone identifier of the sending end according to a target division rule of geographical zone.

Further, the target division rule includes:

a correspondence between geographical zone division granularities and target communication ranges; and a geographical zone identifier calculation manner; where the target communication range is at least one fixed value prescribed by a protocol.

Optionally, when the first information includes the communication range indicator; or when the first information includes: the correspondence between side lengths of geographical zones and communication ranges, and the geographical zone division rule, the first information further includes: a geographical zone identifier of the sending end and auxiliary indication information within a communication range, where the auxiliary indication information is used for determining at least one target zone within the communication range.

Optionally, the communication range indicator is used for indicating a receiving-end zone for which HARQ feedback is required.

The communication range indicator is used for indicating at least one of the following:

a layer index of a geographical zone adjacent to a geographical zone in which the sending end is located;

a layer index of a geographical zone covered by a control node, where the geographical zone is adjacent to a geographical zone that is covered by the control node and in which the sending end is located;

a geographical distance between the sending end and the receiving end; and a relationship between a geographical zone identifier of the sending end and that of the receiving end.

Optionally, the communication range indicator includes one first target codepoint.

The first target codepoint is one of at least one first preset codepoint, and each codepoint in the at least one first preset codepoint corresponds to one communication range.

Optionally, the geographical zone identifier of the sending end is indicated by one codepoint.

Optionally, when the first information includes the correspondence between side lengths of geographical zones and communication ranges and the geographical zone division rule; or when the first information includes the correspondence between side lengths of geographical zones and communication ranges and the geographical zone division rule, and the first information further includes auxiliary indication information within a communication range, the first information further includes: a geographical zone identifier of the sending end; and
- a manner of determining the geographical zone identifier of the sending end is:
- determining the geographical zone identifier of the sending end according to the geographical zone division rule.

Further, the geographical zone division rule is determined by a communication range of each transmission.

The geographical zone division rule includes:
side length indication information of a geographical zone;
per-dimension reuse factor indication information of the geographical zone; and
a geographical zone identifier calculation manner.

Further, the auxiliary indication information includes:
a second target codepoint; where
the second target codepoint is one of at least one second preset codepoint, and each codepoint in the at least one second preset codepoint corresponds to one target zone within a communication range.

Optionally, when the first information includes the coverage area identifier of the control node serving the sending end; or when the first information includes the coverage area identifier of the control node serving the sending end and the communication range indicator; or when the first information includes the coverage area identifier of the control node serving the sending end and the communication range indicator, and the first information further includes a geographical zone identifier of the sending end, in a case that a coverage range of one control node belongs to one geographical zone, before the first sending module 801 sends the first information to the receiving end, the terminal further includes:
- a second receiving module, configured to receive information about a coverage area identifier of a control node that is sent by the control node by using second information.

Optionally, when the first information includes the coverage area identifier of the control node serving the sending end; or when the first information includes the coverage area identifier of the control node serving the sending end and the communication range indicator; or when the first information includes the coverage area identifier of the control node serving the sending end and the communication range indicator, and the first information further includes a geographical zone identifier of the sending end, in a case that there are at least two geographical zones within a coverage range of one control node, before the first sending module 801 sends the first information to the receiving end, the terminal 800 further includes:
- a third receiving module, configured to receive a division rule of geographical zones within coverage of the control node and a division rule of geographical zones within coverage of each of neighboring control nodes, where the division rules are sent by using second information by the control node.

Further, the second information is indicated by using at least one of the following manners:
system information, radio resource control information, a medium access control control element, physical sidelink control information, downlink control information, and direct communication link feedback control information.

Optionally, when the first information includes the coverage area identifier of the control node serving the sending end and the communication range indicator, and the first information further includes a geographical zone identifier of the sending end, a manner of obtaining the geographical zone identifier of the sending end includes one of the following:
determining the geographical zone identifier of the sending end according to a division rule that is of geographical zones within coverage of the control node and that is sent by the control node; and
receiving the geographical zone identifier of the sending end that is sent by the control node.

Optionally, when the first information includes the coverage area identifier of the control node serving the sending end; or when the first information includes the coverage area identifier of the control node serving the sending end and the communication range indicator; or when the first information includes the coverage area identifier of the control node serving the sending end and the communication range indicator, and the first information further includes a geographical zone identifier of the sending end, if the sending end is in an idle state and the sending end receives no coverage area identifier sent by the control node, the coverage area identifier of the control node serving the sending end is a first preset codepoint.

Optionally, when the first information includes the coverage area identifier of the control node serving the sending end; or when the first information includes the coverage area identifier of the control node serving the sending end and the communication range indicator; or when the first information includes the coverage area identifier of the control node serving the sending end and the communication range indicator, and the first information further includes a geographical zone identifier of the sending end, if the sending end obtains at least two different coverage area identifiers, a coverage area identifier carried in the first information includes one of the following:
a random one of the at least two coverage area identifiers; and
a coverage area identifier corresponding to a first reference signal received power; where
the first reference signal received power is a largest one of reference signal received powers corresponding to all coverage area identifiers.

Optionally, when there is at least one communication range for a multiplexed service packet in one transport block, the communication range indicator satisfies at least one of the following conditions:
if at least one communication range is the same, the communication range indicator is used for indicating one communication range;
if at least part of the at least one communication range is different, the communication range indicator is used for indicating a minimum value of the at least one communication range;
if at least part of the at least one communication range is different, the communication range indicator is used for indicating a maximum value of the at least one communication range;

if at least part of the at least one communication range is different, the communication range indicator is used for indicating an average value of the at least one communication range;

if at least part of the at least one communication range is different, the communication range indicator is used for indicating a communication range value that is closest to an average value of the at least one communication range; and a communication range indicated in the communication range indicator is determined based on a service quality parameter.

It should be noted that the terminal embodiment is a terminal corresponding to the foregoing information sending method applied to the sending end. All the implementations of the foregoing embodiment are applicable to the terminal embodiment, with the same technical effects achieved.

Figure 9:
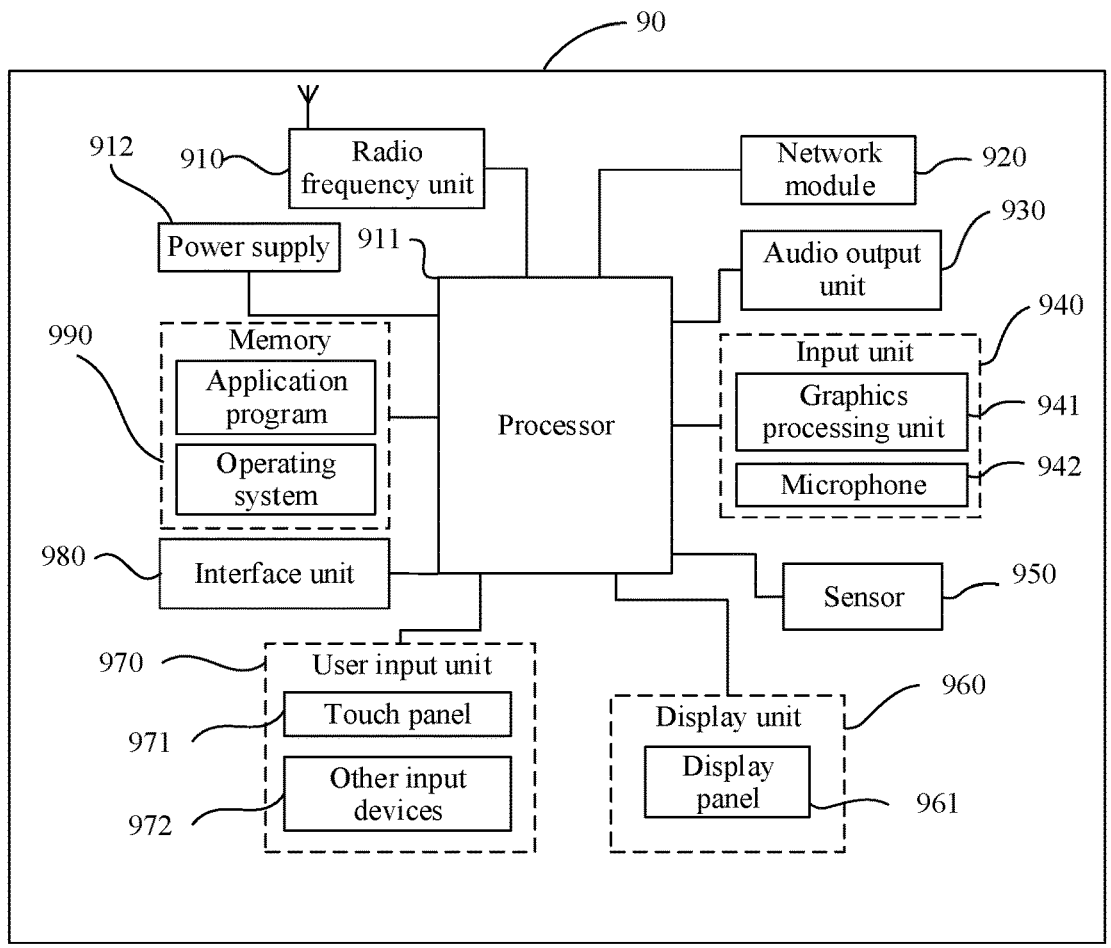
FIG. 9 is a structural block diagram of a terminal according to an embodiment of this disclosure.

FIG. 9 is a schematic diagram of a hardware structure of a terminal for implementing the embodiments of this disclosure.

The terminal 90 is a sending end, and includes but is not limited to components such as a radio frequency unit 910, a network module 920, an audio output unit 930, an input unit 940, a sensor 950, a display unit 960, a user input unit 970, an interface unit 980, a memory 990, a processor 911, and a power supply 912. A person skilled in the art may understand that the structure of the terminal shown in FIG. 9 does not constitute any limitation on the terminal device. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 910 is configured to send first information to the receiving end.

The first information is used to assist the receiving end in determining whether to perform hybrid automatic repeat request HARQ feedback; and the first information includes at least one of the following: a communication range indicator, a correspondence between side lengths of geographical zones and communication ranges, a geographical zone division rule, and a coverage area identifier of a control node serving the sending end.

The terminal in this embodiment of this disclosure uses the first information to assist the receiving end in performing HARQ feedback, so as to resolve the problem that a HARQ feedback manner in the related art causes large signaling overheads and low system resource utilization, thereby reducing communication overheads.

It should be understood that in this embodiment of this disclosure, the radio frequency unit 910 may be configured to receive and send information, or to receive and send a signal in a call process, and specially, after receiving downlink data from a network-side device, send the downlink data to the processor 911 for processing; and also send uplink data to the network-side device. Generally, the radio frequency unit 910 includes but is not limited to an antenna, at least one amplifier, a transceiver, a coupler, a low noise amplifier, a duplexer, and the like. In addition, the radio frequency unit 910 may also communicate with a network and other devices via a wireless communications system.

The terminal provides a user with wireless broadband internet access through the network module 920, for example, helping the user to transmit and receive e-mails, browse web pages, and access streaming media.

The audio output unit 930 may convert audio data received by the radio frequency unit 910 or the network module 920 or stored in the memory 990 into an audio signal and output the audio signal as a sound. Furthermore, the audio output unit 930 may also provide audio output (for example, a call signal received sound or a message received sound) related to a specific function performed by the terminal 90. The audio output unit 930 includes a speaker, a buzzer, a receiver, and the like.

The input unit 940 is configured to receive an audio or video signal. The input unit 940 may include a graphics processing unit (GPU) 941 and a microphone 942. The graphics processing unit 941 processes image data of a still picture or video obtained by an image capture apparatus (such as a camera) in a video capture mode or an image capture mode. A processed image frame may be displayed on the display unit 960. The image frame processed by the graphics processing unit 941 may be stored in the memory 990 (or another storage medium) or be transmitted by the radio frequency unit 910 or the network module 920. The microphone 942 is capable of receiving sounds and processing such sounds into audio data. The processed audio data can be converted into a format output that can be sent to a mobile communication network device through the radio frequency unit 910 in a telephone call mode.

The terminal 90 further includes at least one sensor 950, for example, an optical sensor, a motion sensor, and other sensors. Specifically, the optical sensor may include an ambient light sensor and a proximity sensor. The ambient light sensor may adjust luminance of the display panel 961 based on brightness of ambient light, and the proximity sensor may turn off the display panel 961 and/or backlight when the terminal 90 moves close to an ear. As a type of motion sensor, an accelerometer sensor can detect magnitudes of accelerations in various directions (usually three axes), can detect a magnitude and a direction of gravity when the mobile phone is in a static state, and can be applied to terminal posture recognition (such as screen switching between portrait and landscape, related games, and magnetometer posture calibration), functions related to vibration recognition (such as pedometer and tapping), and the like. The sensor 950 may also include a fingerprint sensor, a pressure sensor, an iris sensor, a molecular sensor, a gyroscope, a barometer, a hygrometer, a thermometer, an infrared sensor, and the like. Details are not described herein.

The display unit 960 is configured to display information input by the user or information provided to the user. The display unit 960 may include a display panel 961, and the display panel 961 may be configured in a form of a liquid crystal display (LCD), an organic light-emitting diode (OLED), or the like.

The user input unit 970 may be configured to: receive a digit or character information that is input, and generate signal input related to user settings and function control of the terminal. Specifically, the user input unit 970 may include a touch panel 971 and other input devices 972. The touch panel 971 is also referred to as a touchscreen and can collect a touch operation (such as an operation performed by the user on the touch panel 971 or near the touch panel 971 with a finger or by using any proper object or accessory such as a stylus) of the user on or near the touch panel 971. The touch panel 971 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 911, and can receive a command transmitted by the processor 911 and execute the command. In addition, the touch panel 971 may be implemented in a plurality of forms, for example, as a resistive, capacitive, infrared, or surface acoustic wave touch panel. The user input unit 970 may further include the other input devices 972 in addition to the touch panel 971. Specifically, the other input devices 972 may include but are not limited to a physical keyboard, a function key (such as a volume control key or an on/off key), a trackball, a mouse, and a joystick. Details are not described herein.

Further, the touch panel 971 may cover the display panel 961. When detecting a touch operation on or near the touch panel 971, the touch panel 961 transmits the touch operation to the processor 911 to determine a type of a touch event. Then, the processor 911 provides a corresponding visual output on the display panel 961 based on the type of the touch event. In FIG. 9, the touch panel 971 and the display panel 961 serve as two independent components to implement input and output functions of the terminal. In some embodiments, however, the touch panel 971 may be integrated with the display panel 961 to implement the input and output functions of the terminal. This is not specifically limited herein.

The interface unit 980 is an interface between an external apparatus and the terminal 90. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 980 may be configured to: receive input (for example, data information and power) from the external apparatus, and transmit the received input to one or more elements in the terminal 90, or may be configured to transmit data between the terminal 90 and the external apparatus.

The memory 990 may be configured to store software programs and various data. The memory 990 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 990 may include a high-speed random access memory, and may further include a non-volatile memory such as at least one disk storage device, a flash memory device, or another volatile solid-state storage device.

The processor 911 is a control center of the terminal, and is connected to all components of the terminal by using various interfaces and lines. By running or executing a software program and/or module that is stored in the memory 990 and calling data stored in the memory 990, the processor 911 executes various functions of the terminal and processes data, so as to perform overall monitoring on the terminal. The processor 911 may include one or more processing units. Optionally, an application processor and a modem processor may be integrated in the processor 911. The application processor primarily processes an operating system, user interfaces, application programs, and the like. The modem processor primarily processes radio communication. It can be understood that the modem processor may alternatively be not integrated in the processor 911.

The terminal 90 may further include the power supply 912 (for example, a battery) supplying power to all components. Optionally, the power supply 912 may be logically connected to the processor 911 through a power management system. In this way, functions such as charge management, discharge management, and power consumption management are implemented by using the power management system.

In addition, the terminal 90 includes some functional modules that are not illustrated. Details are not described herein.

It should be further noted that the processor 910 is further configured to implement other processes of the information sending method applied to the sending terminal in the foregoing embodiment, and details are not repeated herein.

Optionally, an embodiment of this disclosure further provides a terminal, including a processor 911, a memory 990, and a computer program stored in the memory 990 and capable of running on the processor 911. When the computer program is executed by the processor 911, the processes of the foregoing embodiment of the information sending method applied to the sending end can be implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the information sending method applied to the sending end can be implemented, with the same technical effects achieved. To avoid repetition, details are not described herein again. The computer-readable storage medium is, for example, a read-only memory (ROM), a random access memory (RAM), a magnetic disk, or an optical disc.

Figure 10:
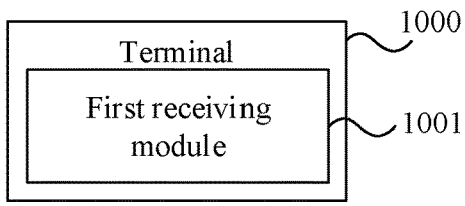
FIG. 10 is a second schematic modular diagram of a terminal according to an embodiment of this disclosure.

As shown in FIG. 10, an embodiment of this disclosure further provides a terminal 1000, where the terminal is a receiving end, including:

a first receiving module 1001, configured to receive first information sent by a sending end; where the first information is used to assist the receiving end in determining whether to perform hybrid automatic repeat request HARQ feedback; and the first information includes at least one of the following: a communication range indicator, a correspondence between side lengths of geographical zones and communication ranges, a geographical zone division rule, and a coverage area identifier of a control node serving the sending end.

Optionally, the communication range indicator is used for indicating a receiving-end zone for which HARQ feedback is required.

The communication range indicator is used for indicating at least one of the following:

a layer index of a geographical zone adjacent to a geographical zone in which the sending end is located;

a layer index of a geographical zone covered by a control node, where the geographical zone is adjacent to a geographical zone that is covered by the control node and in which the sending end is located;

a geographical distance between the sending end and the receiving end; and a relationship between a geographical zone identifier of the sending end and that of the receiving end.

Optionally, the communication range indicator includes one first target codepoint.

The first target codepoint is one of at least one first preset codepoint, and each codepoint in the at least one first preset codepoint corresponds to one communication range.

Optionally, when the first information includes the communication range indicator; or when the first information includes: the correspondence between side lengths of geographical zones and communication ranges, and the geographical zone division rule, the first information further includes: a geographical zone identifier of the sending end and auxiliary indication information within a communication range, where the auxiliary indication information is used for determining at least one target zone within the communication range.

Optionally, when the first information includes the communication range indicator, and the first information further includes a geographical zone identifier of the sending end, after the first receiving module 1001 receives the first information sent by the sending end, the terminal further includes:

a first determining module, configured to determine a geographical zone identifier of the receiving end according to a target division rule of geographical zone.

Further, the target division rule includes:

a correspondence between geographical zone division granularities and target communication ranges; and a geographical zone identifier calculation manner; where the target communication range is at least one fixed value prescribed by a protocol.

Optionally, when the first information includes the correspondence between side lengths of geographical zones and communication ranges and the geographical zone division rule; or when the first information includes the correspondence between side lengths of geographical zones and communication ranges and the geographical zone division rule, and the first information further includes auxiliary indication information within a communication range, the first information further includes: a geographical zone identifier of the sending end; and after the first receiving module 1001 receives the first information sent by the sending end, the terminal 1000 further includes:

a second determining module, configured to determine a geographical zone identifier of the receiving end according to the geographical zone division rule.

Further, the geographical zone division rule is determined by a communication range of each transmission.

The geographical zone division rule includes:

side length indication information of a geographical zone;

per-dimension reuse factor indication information of the geographical zone; and a geographical zone identifier calculation manner.

Optionally, the auxiliary indication information includes:

a second target codepoint; where the second target codepoint is one of at least one second preset codepoint, and each codepoint in the at least one second preset codepoint corresponds to one target zone within a communication range.

Optionally, when the first information includes the communication range indicator, and the first information further includes a geographical zone identifier of the sending end, after the first receiving module 1001 receives the first information sent by the sending end, the terminal further includes:

a first judgment module, configured to: based on the geographical zone identifier of the sending end and the communication range indicator, determine whether the receiving end is located within a range indicated by the communication range indicator; and a first execution module, configured to: if the receiving end is located within the range indicated by the communication range indicator, perform HARQ feedback.

Optionally, when the first information includes the communication range indicator, and the first information further includes a geographical zone identifier of the sending end and auxiliary indication information within a communication range, after the first receiving module 1001 receives the first information sent by the sending end, the terminal further includes:

a first judgment module, configured to: based on the geographical zone identifier of the sending end and the communication range indicator, determine whether the receiving end is located within a range indicated by the communication range indicator;

a second judgment module, configured to: if the receiving end is located within the range indicated by the communication range indicator, determine, based on the auxiliary indication information within the communication range, whether the receiving end is located within a range indicated by the auxiliary indication information within the communication range; and a second execution module, configured to: if the receiving end is located within the range indicated by the auxiliary indication information within the communication range, perform HARQ feedback.

Further, when the communication range indicator is used for indicating a layer index of a geographical zone adjacent to a geographical zone in which the sending end is located, the first judgment module is configured to implement one of the following:

if the layer index is zero and a geographical zone identifier of the receiving end is the same as the geographical zone identifier of the sending end, the receiving end is located within the range indicated by the communication range indicator;

if the layer index is zero and the geographical zone identifier of the receiving end is different from the geographical zone identifier of the sending end, the receiving end is located beyond the range indicated by the communication range indicator; and if the layer index is non-zero, determining, based on the geographical zone identifier of the receiving end and the geographical zone identifier of the sending end, whether the receiving end is located within a range of an $n^{th}$-layer geographical zone adjacent to the geographical zone in which the sending end is located, where if located within the range of the $n^{th}$-layer geographical zone, the receiving end is located within the range indicated by the communication range indicator; or if not located within the range of the $n^{th}$-layer geographical zone, the receiving end is not located within the range indicated by the communication range indicator; where n is an integer greater than or equal to 1.

Further, when the communication range indicator is used for indicating a geographical distance between the sending end and the receiving end, the first judgment module is configured to implement one of the following:

determining a first distance and a second distance based on positioning information of the receiving end and the geographical zone identifier of the sending end, where if the first distance is less than the geographical distance between the sending end and the receiving end, the receiving end is located within the range indicated by the communication range indicator, or if the second distance is less than the geographical distance between the sending end and the receiving end, the receiving end is located within the range indicated by the communication range indicator, or if an average value of the first distance and the second distance is less than the geographical distance between the sending end and the receiving end, the receiving end is located within the range indicated by the communication range indicator, where the first distance is greater than the second distance;

obtaining a first target distance based on the positioning information of the receiving end and a first reference point of the geographical zone in which the sending end is located, where if the first target distance is less than the geographical distance between the sending end and the receiving end, the receiving end is located within the range indicated by the communication range indicator;

obtaining a second target distance based on a second reference point of a geographical zone in which the receiving end is located and a third reference point of the geographical zone in which the sending end is located, where if the second target distance is less than the geographical distance between the sending end and the receiving end, the receiving end is located within the range indicated by the communication range indicator; and obtaining a first reference value based on a geographical zone identifier of the receiving end and the geographical zone identifier of the sending end, where if the first reference value is less than the geographical distance between the sending end and the receiving end, the receiving end is located within the range indicated by the communication range indicator.

Further, when the communication range indicator is used for indicating a relationship between a geographical zone identifier of the sending end and that of the receiving end, the first judgment module is configured to implement one of the following:

when the relationship between the geographical zone identifier of the sending end and that of the receiving end is a difference threshold for the geographical zone identifiers, if an absolute value of a difference between the geographical zone identifier of the sending end and that of the receiving end is less than the difference threshold, the receiving end is located within the range indicated by the communication range indicator; and when the relationship between the geographical zone identifier of the sending end and that of the receiving end is a first threshold obtained through a modular operation on geographical zone identifiers, and if a result of a modular operation on the geographical zone identifiers of the sending end and the receiving end meets a requirement of the first threshold, the receiving end is located within the range indicated by the communication range indicator.

Optionally, in a case that the first information includes: the correspondence between side lengths of geographical zones and communication ranges and the geographical zone division rule, and the first information further includes a geographical zone identifier of the sending end, the terminal further includes:

a third judgment module, configured to determine, based on a geographical zone identifier of the receiving end and the geographical zone identifier of the sending end, whether the receiving end is located within a range of an $h^{th}$-layer geographical zone adjacent to a geographical zone in which the sending end is located; and a third execution module, configured to: perform HARQ feedback if the receiving end is located within the range of the $h^{th}$-layer geographical zone adjacent to the geographical zone in which the sending end is located; where h is an integer greater than or equal to 1.

Optionally, the first information further includes auxiliary indication information within a communication range, the third execution module is configured to implement:

if the receiving end is located within the range of the $h^{th}$-layer geographical zone adjacent to the geographical zone in which the sending end is located, determining whether a location of the receiving end is within a range indicated by the auxiliary indication information; and if the location of the receiving end is within the range indicated by the auxiliary indication information, performing HARQ feedback.

Optionally, in a case that the first information includes the coverage area identifier of the control node serving the sending end, the terminal further includes:

a third determining module, configured to: based on the coverage area identifier of the control node serving the sending end and a coverage area identifier of a control node serving the receiving end, determine whether to perform HARQ feedback.

Further, the third determining module implements one of the following:

if the coverage area identifier of the control node serving the sending end is the same as the coverage area identifier of the control node serving the receiving end, performing HARQ feedback;

if an absolute value of a difference between the coverage area identifier of the control node serving the sending end and the coverage area identifier of the control node serving the receiving end is less than a first preset threshold, performing HARQ feedback; and if a result of a modulo operation on the coverage area identifier of the control node serving the sending end and the coverage area identifier of the control node serving the receiving end satisfies a second preset threshold, performing HARQ feedback.

Optionally, when the first information includes the coverage area identifier of the control node serving the sending end and the communication range indicator, the terminal further includes:

a fourth determining module, configured to: based on the coverage area identifier of the control node serving the sending end and a coverage area identifier of a control node serving the receiving end, determine whether a geographical location of the receiving end meets a range indicated by the communication range indicator, and determine, based on a judgment result, whether to perform HARQ feedback.

Further, when the communication range indicator is used for indicating a layer index of a geographical zone covered by a control node, where the geographical zone is adjacent to a geographical zone that is covered by the control node and in which the sending end is located, the fourth determining module is configured to implement one of the following:

if the layer index is zero and the coverage area identifier of the control node serving the sending end is the same as the coverage area identifier of the control node serving the receiving end, performing HARQ feedback; and if the layer index is non-zero, based on the coverage area identifier of the control node serving the sending end and the coverage area identifier of the control node serving the receiving end, determining whether a coverage range of the control node serving the receiving end is located within a range of an $m^{th}$-layer geographical zone adjacent to a coverage range of the control node serving the sending end; and if located within the range of the $m^{th}$-layer geographical zone, performing HARQ feedback; where m is an integer greater than or equal to 1.

Further, when the communication range indicator is used for indicating a geographical distance between the sending end and the receiving end, the fourth determining module is configured to implement one of the following:

determining a third distance and a fourth distance based on positioning information of the receiving end and the coverage area identifier of the control node serving the sending end; and if the third distance is less than the geographical distance between the sending end and the receiving end, performing HARQ feedback, or if the fourth distance is less than the geographical distance between the sending end and the receiving end, performing HARQ feedback, or if an average value of the third distance and the fourth distance is less than the geographical distance between the sending end and the receiving end, performing HARQ feedback, where the third distance is greater than the fourth distance;

obtaining a third target distance based on the positioning information of the receiving end and a fourth reference point of the coverage area of the control node serving the sending end; and if the third target distance is less than the geographical distance between the sending end and the receiving end, performing HARQ feedback;

obtaining a fourth target distance based on a fifth reference point of the coverage area of the control node serving the receiving end and a sixth reference point of the coverage area of the control node serving the sending end; and if the fourth target distance is less than the geographical distance between the sending end and the receiving end, performing HARQ feedback; and obtaining a second reference value based on the coverage area identifier of the control node serving the receiving end and the coverage area identifier of the control node serving the sending end; and if the second reference value is less than the geographical distance between the sending end and the receiving end, performing HARQ feedback.

Optionally, in a case that the first information includes the coverage area identifier of the control node serving the sending end and the communication range indicator, and the first information further includes a geographical zone identifier of the sending end, the terminal further includes:

a fourth execution module, configured to: determine a location of the sending end based on the geographical zone identifier of the sending end and the coverage area identifier of the control node serving the sending end; and if a location of the receiving end is located within a range indicated by the communication range indicator, perform HARQ feedback.

Further, the fourth execution module includes:

a first obtaining unit, configured to obtain a division rule of geographical zones within a coverage range of a control node serving the receiving end and a division rule of geographical zones within coverage of each of neighboring control nodes; where the division rules are sent by the control node serving the receiving end; and a first execution unit, configured to: according to the division rule of geographical zones within the coverage range of the control node serving the receiving end and the division rule of geographical zones within coverage of each of the neighboring control nodes, if a division rule of geographical zones within a coverage range of the control node serving the sending end is obtained, determine a location of the sending end according to the division rule of geographical zones within the coverage range of the control node serving the sending end and the division rule of geographical zones within the coverage range of the control node serving the receiving end, and based on the geographical zone identifier of the sending end and the coverage area identifier of the control node serving the sending end; and perform HARQ feedback if the location of the receiving end is located within the range indicated by the communication range indicator.

Specifically, if the division rule of geographical zones within the coverage range of the control node serving the sending end is the same as the division rule of geographical zones within the coverage range of the control node serving the receiving end, when the communication range indicator is used for indicating a layer index of a geographical zone adjacent to a geographical zone in which the sending end is located, the first execution unit is configured to implement at least one of the following:

if the layer index is zero and a geographical zone identifier of the receiving end is the same as the geographical zone identifier of the sending end, performing HARQ feedback; and if the layer index is non-zero, determining, based on the geographical zone identifier of the receiving end and the geographical zone identifier of the sending end, whether the receiving end is located within a range of an $i^{th}$-layer geographical zone adjacent to the geographical zone in which the sending end is located; and if the receiving end is located within the range of the $i^{th}$-layer geographical zone, performing HARQ feedback; where i is an integer greater than or equal to 1.

Specifically, if the division rule of geographical zones within the coverage range of the control node serving the sending end is the same as the division rule of geographical zones within the coverage range of the control node serving the receiving end, when the communication range indicator is a geographical distance between the sending end and the receiving end, the first execution unit is configured to implement at least one of the following:

determining a fifth distance and a sixth distance based on positioning information of the receiving end and the geographical zone identifier of the sending end; and if the fifth distance is less than the geographical distance between the sending end and the receiving end, performing HARQ feedback, or if the sixth distance is less than the geographical distance between the sending end and the receiving end, performing HARQ feedback, or if an average value of the fifth distance and the sixth distance is less than the geographical distance between the sending end and the receiving end, performing HARQ feedback, where the fifth distance is greater than the sixth distance;

obtaining a fourth target distance based on the positioning information of the receiving end and a seventh reference point of a geographical zone in which the sending end is located; and if the fourth target distance is less than the geographical distance between the sending end and the receiving end, performing HARQ feedback;

obtaining a fifth target distance based on an eighth reference point of a geographical zone in which the receiving end is located and a ninth reference point of the geographical zone in which the sending end is located; and if the fifth target distance is less than the geographical distance between the sending end and the receiving end, performing HARQ feedback; and obtaining a third reference value based on a geographical zone identifier of the receiving end and the geographical zone identifier of the sending end; and if the third reference value is less than the geographical distance between the sending end and the receiving end, performing HARQ feedback.

Specifically, if the division rule of geographical zones within the coverage range of the control node serving the sending end is different from the division rule of geographical zones within the coverage range of the control node serving the receiving end, when the communication range indicator is used for indicating a layer index of a geographical zone adjacent to a geographical zone in which the sending end is located, the first execution unit is configured to implement at least one of the following:

if the layer index is zero, when the coverage area identifier of the control node serving the sending end is the same as the coverage area identifier of the control node serving the receiving end, and the geographical zone identifier of the receiving end is the same as the geographical zone identifier of the sending end, performing HARQ feedback; and if the layer index is non-zero, when the coverage area identifier of the control node serving the sending end is the same as the coverage area identifier of the control node serving the receiving end, determining, based on the geographical zone identifier of the receiving end and the geographical zone identifier of the sending end, whether the receiving end is located within a range of a $j^{th}$-layer geographical zone adjacent to the geographical zone in which the sending end is located; and if the receiving end is located within the range of the $j^{th}$-layer geographical zone, performing HARQ feedback; where j is an integer greater than or equal to 1.

Specifically, if the division rule of geographical zones within the coverage range of the control node serving the sending end is different from the division rule of geographical zones within the coverage range of the control node serving the receiving end, when the communication range indicator is a geographical distance between the sending end and the receiving end, the first execution unit is configured to implement at least one of the following:

determining a seventh distance and an eighth distance based on positioning information of the receiving end, the geographical zone identifier of the sending end, and the coverage area identifier of the control node serving the sending end; and if the seventh distance is less than the geographical distance between the sending end and the receiving end, performing HARQ feedback, or if the eighth distance is less than the geographical distance between the sending end and the receiving end, performing HARQ feedback, or if an average value of the seventh distance and the eighth distance is less than the geographical distance between the sending end and the receiving end, performing HARQ feedback, where the seventh distance is greater than the eighth distance;

obtaining a sixth target distance based on the positioning information of the receiving end, the coverage area identifier of the control node serving the sending end, and a tenth reference point of the geographical zone in which the sending end is located; and if the sixth target distance is less than the geographical distance between the sending end and the receiving end, performing HARQ feedback;

obtaining a seventh target distance based on an eleventh reference point of the geographical zone in which the receiving end is located, the coverage area identifier of the control node serving the sending end, and a twelfth reference point of the geographical zone in which the sending end is located; and if the seventh target distance is less than the geographical distance between the sending end and the receiving end, performing HARQ feedback; and obtaining a fourth reference value based on the geographical zone identifier of the receiving end, the geographical zone identifier of the sending end, and the coverage area identifier of the control node serving the sending end; and if the fourth reference value is less than the geographical distance between the sending end and the receiving end, performing HARQ feedback.

Specifically, if the division rule of geographical zones within the coverage range of the control node serving the sending end is different from the division rule of geographical zones within the coverage range of the control node serving the receiving end, when the communication range indicator is a relationship between the geographical zone identifier of the sending end and that of the receiving end; or if the division rule of geographical zones within the coverage range of the control node serving the sending end is the same as the division rule of geographical zones within the coverage range of the control node serving the receiving end, when the communication range indicator is a relationship between the geographical zone identifier of the sending end and that of the receiving end, the first execution unit is configured to implement at least one of the following:

when the relationship between the geographical zone identifier of the sending end and that of the receiving end is a difference threshold for the geographical zone identifiers, if an absolute value of a difference between the geographical zone identifier of the sending end and that of the receiving end is less than the difference threshold, performing HARQ feedback; and when the relationship between the geographical zone identifier of the sending end and that of the receiving end is a third threshold obtained through a modular operation on geographical zone identifiers, and if a result of a modular operation on the geographical zone identifiers of the sending end and the receiving end meets a requirement of the third threshold, performing HARQ feedback.

Optionally, after the first obtaining unit obtains the division rule of geographical zones within the coverage range of the control node serving the receiving end and the division rule of geographical zones within coverage of each of neighboring control nodes; where the division rules are sent by the control node serving the receiving end, the following is further included:

a second execution unit, configured to: if the receiving end does not obtain the division rule of geographical zones within the coverage range of the control node serving the sending end, skip HARQ feedback or always perform HARQ feedback.

Optionally, the terminal further includes:

a fifth execution module, configured to: if the coverage area identifier of the control node serving the sending end is a first preset codepoint, skip HARQ feedback or always perform HARQ feedback.

Optionally, the terminal further includes:

a sixth execution module, configured to: if the receiving end is in an idle state, skip HARQ feedback or always perform HARQ feedback.

It should be noted that the terminal embodiment is a terminal corresponding to the foregoing information receiving method applied to the receiving end. All the implementations of the foregoing embodiment are applicable to the terminal embodiment, with the same technical effects achieved.

It should be further noted that an embodiment of this disclosure further provides a terminal, where the terminal is a receiving end, and the specific structure of the receiving end is the same as the specific structure of the sending end shown in FIG. 9.

Specifically, a radio frequency unit of the receiving end is configured to implement:

receiving first information sent by a sending end; where the first information is used to assist the receiving end in determining whether to perform hybrid automatic repeat request HARQ feedback; and the first information includes at least one of the following: a communication range indicator, a correspondence between side lengths of geographical zones and communication ranges, a geographical zone division rule, and a coverage area identifier of a control node serving the sending end.

It should be further noted that a processor of the receiving end is further configured to implement other processes of the information receiving method applied to the receiving end in the foregoing embodiment, and details are not repeated herein.

Optionally, an embodiment of this disclosure further provides a terminal, where the terminal is a receiving end, including a processor, a memory, and a computer program stored in the memory and capable of running on the processor. When the computer program is executed by the processor, the processes of the foregoing embodiment of the information receiving method applied to the receiving end can be implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the information receiving method applied to the receiving end can be implemented, with the same technical effects achieved. To avoid repetition, details are not described herein again. The computer-readable storage medium is, for example, a read-only memory (ROM), a random access memory (RAM), a magnetic disk, or an optical disc.

Figure 11:
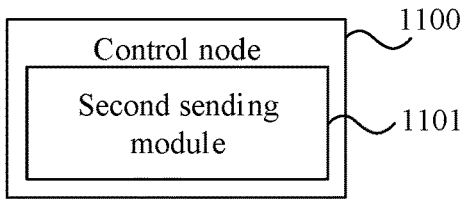
FIG. 11 is a schematic modular diagram of a control node according to an embodiment of this disclosure.

As shown in FIG. 11, an embodiment of this disclosure further provides a control node 1100, including:

a second sending module 1101, configured to send information about a coverage area identifier of the control node to a terminal; where the terminal is a receiving end or a sending end.

Optionally, in a case that there are at least two geographical zones within a coverage range of one control node, the control node 1100 further includes:

a third sending module, configured to send a division rule of geographical zones within coverage of the control node and a division rule of geographical zones within coverage of each of neighboring control nodes.

Optionally, the control node further includes:

a fifth determining module, configured to determine a geographical zone identifier of the terminal based on location information of the terminal; and a fourth sending module, configured to send the geographical zone identifier to the terminal.

An embodiment of this disclosure further provides a control node, including a processor, a memory, and a computer program stored in the memory and capable of running on the processor. When the computer program is executed by the processor, the processes of the foregoing embodiment of the information sending method applied to the control node can be implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the information sending method applied to the control node are implemented, with the same technical effects achieved. To avoid repetition, details are not described herein again. The computer-readable storage medium is, for example, a read-only memory (ROM), a random access memory (RAM), a magnetic disk, or an optical disc.

Figure 12:
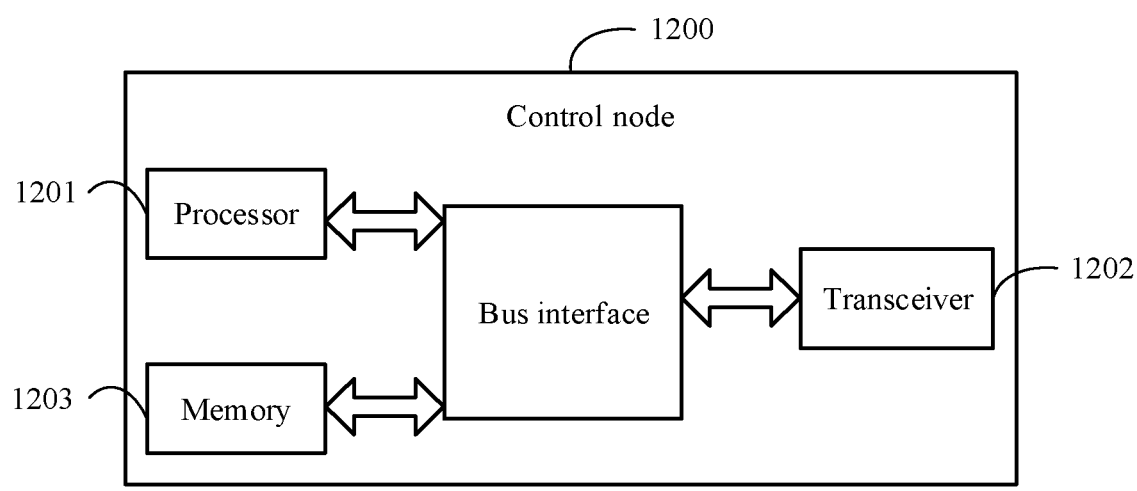
FIG. 12 is a structural block diagram of a control node according to an embodiment of this disclosure.

FIG. 12 is a structural diagram of a control node according to an embodiment of this disclosure. The control node is capable of implementing details of the foregoing information sending method, with the same effects achieved. As shown in FIG. 12, the control node 1200 includes a processor 1201, a transceiver 1202, a memory 1203, and a bus interface.

The processor 1201 is configured to read a program in the memory 1203 and execute the following process:

sending information about a coverage area identifier of the control node to a terminal by using the transceiver 1202; where the terminal is a receiving end or a sending end.

In FIG. 12, a bus architecture may include any quantity of interconnected buses and bridges, specifically for interconnecting various circuits of one or more processors represented by the processor 1201 and a memory represented by the memory 1203. The bus architecture may further interconnect various other circuits such as a peripheral device, a voltage regulator, and a power management circuit. These are all well known in the art, and therefore are not further described in this specification. The bus interface provides an interface. The transceiver 1202 may be a plurality of components, that is, the transceiver 1202 includes a transmitter and a receiver, and provides a unit for communicating with various other apparatuses on a transmission medium.

Optionally, in a case that there are at least two geographical zones within a coverage range of one control node, the processor 1201 is configured to read a program in the memory 1203 and execute the following process:

sending a division rule of geographical zones within coverage of the control node and a division rule of geographical zones within coverage of each of neighboring control nodes by using the transceiver 1202.

Optionally, the processor 1201 is configured to read a program in the memory 1203 and execute the following processes:

determining a geographical zone identifier of the terminal based on location information of the terminal; and sending the geographical zone identifier to the terminal.

The control node may be a network-side device, a road side unit (RSU), a relay device (Relay), an integrated access and backhaul (IAB) node, or another terminal different from the terminal in this embodiment of this disclosure. When the control node is a network-side device, the network-side device may be a base station (BTS) in a Global System of Mobile Communication (GSM) or Code Division Multiple Access (CDMA), or may be a base station (NodeB, NB) in Wideband Code Division Multiple Access (WCDMA), or an evolved base station (Evolved Node B, eNB, or eNodeB) in LTE, or a relay station, or an access point, or a base station in a future 5G network, which is not limited herein.

The foregoing descriptions are optional implementations of this disclosure. It should be noted that a person of ordinary skill in the art may make several improvements and polishing without departing from the principle described in this disclosure and the improvements and polishing shall fall within the protection scope of this disclosure.

What is claimed is:

1. An information sending method, performed by a sending end and comprising:

sending first information to a receiving end; wherein the first information is used to assist the receiving end in determining whether to perform hybrid automatic repeat request (HARQ) feedback;

the first information comprises a communication range indicator and a geographical zone identifier of the sending end; and when there are at least two communication ranges for multiplexed service packets in one transport block, the communication range indicator is used for indicating a maximum value of the at least two communication ranges;

wherein a manner of determining the geographical zone identifier of the sending end comprises:

determining the geographical zone identifier of the sending end according to a geographical zone division rule;

wherein, the geographical zone division rule comprises:

side length indication information of a geographical zone; and a geographical zone identifier calculation manner;

wherein, the side length indication information of the geographical zone division rule is determined according to the communication range indicated by the communication range indicator.

2. The information sending method according to claim 1, wherein the first information is indicated by using at least one of the following manners:

physical sidelink control information;

direct communication interface radio resource control information; or a medium access control control element.

3. The information sending method according to claim 1, wherein the first information further comprises: auxiliary indication information within a communication range, wherein the auxiliary indication information is used for determining at least one target zone within the communication range.

4. The information sending method according to claim 1, wherein the communication range indicator is used for indicating a receiving-end zone for which HARQ feedback is required; and the communication range indicator is used for indicating at least one of the following:

a layer index of a geographical zone adjacent to a geographical zone in which the sending end is located;

a layer index of a geographical zone covered by a control node, wherein the geographical zone is adjacent to a geographical zone that is covered by the control node and in which the sending end is located;

a geographical distance between the sending end and the receiving end; or a relationship between a geographical zone identifier of the sending end and that of the receiving end.

5. The information sending method according to claim 1, wherein the communication range indicator comprises one first target codepoint; and the first target codepoint is one of at least one first preset codepoint, or each codepoint in the at least one first preset codepoint corresponds to one communication range.

6. The information sending method according to claim 1, wherein the first information further comprises at least one of the following: a correspondence between side lengths of geographical zones and communication ranges, a geographical zone division rule, or a coverage area identifier of a control node serving the sending end;

when the first information further comprises the coverage area identifier of the control node serving the sending end, in a case that a coverage range of one control node belongs to one geographical zone, before the sending first information to a receiving end, further comprising:

receiving information about a coverage area identifier of a control node that is sent by the control node by using second information.

7. The information sending method according to claim 1, wherein the first information further comprises at least one of the following: a correspondence between side lengths of geographical zones and communication ranges, a geographical zone division rule, or a coverage area identifier of a control node serving the sending end;

when the first information further comprises the coverage area identifier of the control node serving the sending end, in a case that there are at least two geographical zones within a coverage range of one control node, before the sending first information to a receiving end, further comprising:

receiving a division rule of geographical zones within coverage of the control node and a division rule of geographical zones within coverage of each of neighboring control nodes, wherein the division rules are sent by using second information by the control node.

8. The information sending method according to claim 1, wherein a communication range indicated in the communication range indicator is determined based on a service quality parameter.

9. An information receiving method, performed by a receiving end and comprising:

receiving first information sent by a sending end; wherein the first information comprises a communication range indicator and a geographical zone identifier of the sending end; and when there are at least two communication ranges for multiplexed service packets in one transport block, the communication range indicator is used for indicating a maximum value of the at least two communication ranges;

obtaining a first target distance based on positioning information of the receiving end and a first reference point of a geographical zone in which the sending end is located; if the first target distance is less than the communication range indicator, performing HARQ feedback; or determining, based on the geographical zone identifier of the sending end and the communication range indicator, whether the receiving end is located within a range indicated by the communication range indicator; and if the receiving end is located within the range indicated by the communication range indicator, performing HARQ feedback; or after the receiving first information sent by a sending end, the information receiving method further comprises: determining, based on the geographical zone identifier of the sending end and the communication range indicator, whether the receiving end is located within a range indicated by the communication range indicator; and if the receiving end is located within the range indicated by the communication range indicator, performing HARQ feedback;

wherein the geographical zone identifier of the sending end is determined according to a geographical zone division rule;

wherein, the geographical zone division rule comprises: side length indication information of a geographical zone; and a geographical zone identifier calculation manner;

wherein, the side length indication information of the geographical zone division rule is determined according to the communication range indicated by the communication range indicator.

10. The information receiving method according to claim 9, wherein the communication range indicator is used for indicating a receiving-end zone for which HARQ feedback is required; and the communication range indicator is used for indicating at least one of the following:

a layer index of a geographical zone adjacent to the geographical zone in which the sending end is located;

a layer index of a geographical zone covered by a control node, wherein the geographical zone is adjacent to a geographical zone that is covered by the control node and in which the sending end is located;

a geographical distance between the sending end and the receiving end; or a relationship between a geographical zone identifier of the sending end and that of the receiving end.

11. The information receiving method according to claim 9, wherein the first information further comprises: auxiliary indication information within a communication range, wherein the auxiliary indication information is used for determining at least one target zone within the communication range.

12. The information receiving method according to claim 9, wherein after the receiving first information sent by a sending end, further comprising:

determining a geographical zone identifier of the receiving end according to a target division rule of geographical zone.

13. The information receiving method according to claim 9, wherein the first information further comprises at least one of the following: a correspondence between side lengths of geographical zones and communication ranges, a geographical zone division rule, or a coverage area identifier of a control node serving the sending end.

14. The information receiving method according to claim 9, wherein when the first information further comprises auxiliary indication information within a communication range, after the receiving first information sent by a sending end, the information receiving method further comprises:

determining, based on the geographical zone identifier of the sending end and the communication range indicator, whether the receiving end is located within a range indicated by the communication range indicator;

if the receiving end is located within the range indicated by the communication range indicator, determining, based on the auxiliary indication information within the communication range, whether the receiving end is located within a range indicated by the auxiliary indication information within the communication range; and if the receiving end is located within the range indicated by the auxiliary indication information within the communication range, performing HARQ feedback.

15. The information receiving method according to claim 9, wherein when the communication range indicator is used for indicating a relationship between a geographical zone identifier of the sending end and that of the receiving end, the determining, based on the geographical zone identifier of the sending end and the communication range indicator, whether the receiving end is located within a range indicated by the communication range indicator comprises one of the following:

when the relationship between the geographical zone identifier of the sending end and that of the receiving end is a difference threshold for the geographical zone identifiers, if an absolute value of a difference between the geographical zone identifier of the sending end and that of the receiving end is less than the difference threshold, the receiving end is located within the range indicated by the communication range indicator; or when the relationship between the geographical zone identifier of the sending end and that of the receiving end is a first threshold obtained through a modular operation on geographical zone identifiers, and if a result of a modular operation on the geographical zone identifiers of the sending end and the receiving end meets a requirement of the first threshold, the receiving end is located within the range indicated by the communication range indicator.

16. The information receiving method according to claim 9, wherein the first reference point is a center point of the geographical zone in which the sending end is located.

17. A non-transitory computer-readable storage medium, wherein a computer program is stored in the non-transitory computer-readable storage medium; when the computer program is executed by a processor, a following information sending method is implemented:

sending first information to a receiving end; wherein the first information is used to assist the receiving end in determining whether to perform hybrid automatic repeat request (HARQ) feedback;

the first information comprises a communication range indicator and a geographical zone identifier of the sending end; and when there are at least two communication ranges for multiplexed service packets in one transport block, the communication range indicator is used for indicating a maximum value of the at least two communication ranges;

wherein a manner of determining the geographical zone identifier of the sending end comprises:

determining the geographical zone identifier of the sending end according to a geographical zone division rule;

wherein, the geographical zone division rule comprises:

side length indication information of a geographical zone; and a geographical zone identifier calculation manner;

wherein, the side length indication information of the geographical zone division rule is determined according to the communication range indicated by the communication range indicator.

18. The non-transitory computer-readable storage medium according to claim 17, wherein the first information is indicated by using at least one of the following manners:

physical sidelink control information;

direct communication interface radio resource control information; or a medium access control control element.

* * * * *